(12) United States Patent
Brockmann et al.

(10) Patent No.: US 9,788,029 B2
(45) Date of Patent: Oct. 10, 2017

(54) INTELLIGENT MULTIPLEXING USING CLASS-BASED, MULTI-DIMENSIONED DECISION LOGIC FOR MANAGED NETWORKS

(71) Applicants: Ronald A. Brockmann, Utrecht (NL); Maarten Hoeben, Amersfoort (NL); Onne Gorter, Hilversum (NL); Gerrit Hiddink, Amersfoort (NL)

(72) Inventors: Ronald A. Brockmann, Utrecht (NL); Maarten Hoeben, Amersfoort (NL); Onne Gorter, Hilversum (NL); Gerrit Hiddink, Amersfoort (NL)

(73) Assignee: ACTIVEVIDEO NETWORKS, INC., San Jose, CA (US)

( * ) Notice: Subject to any disclaimer, the term of this patent is extended or adjusted under 35 U.S.C. 154(b) by 220 days.

(21) Appl. No.: 14/696,462

(22) Filed: Apr. 26, 2015

(65) Prior Publication Data

US 2015/0312599 A1    Oct. 29, 2015

Related U.S. Application Data

(60) Provisional application No. 61/984,697, filed on Apr. 25, 2014.

(51) Int. Cl.
*H04L 12/42* (2006.01)
*H04N 21/2385* (2011.01)
(Continued)

(52) U.S. Cl.
CPC ..... *H04N 21/2385* (2013.01); *H04L 41/0896* (2013.01); *H04L 47/521* (2013.01);
(Continued)

(58) Field of Classification Search
CPC ..... H04L 2012/5631; H04L 2012/5632; H04L 2012/6456; H04L 47/52; H04L 5/0064; H04L 12/1881
See application file for complete search history.

(56) References Cited

U.S. PATENT DOCUMENTS 3,889,050 A    6/1975  Thompson
3,934,079 A    1/1976  Barnhart
(Continued)

FOREIGN PATENT DOCUMENTS

AT    191599 T    4/2000
AT    198969 T    2/2001
(Continued)

OTHER PUBLICATIONS

AC-3 digital audio compression standard, Extract, Dec. 20, 1995, 11 pgs.
(Continued)

*Primary Examiner* — Alvin Zhu
(74) *Attorney, Agent, or Firm* — Morgan, Lewis & Bockius LLP

(57) ABSTRACT

Switched digital television programming for video-on-demand and other interactive television services are combined utilizing a class-based, multi-dimensional decision logic to simultaneously optimize video quality and audio uniformity while minimizing latency during user interactions with the system over managed networks such as cable and satellite television networks. A group of user sessions are assigned to a single modulator. The user sessions include data in a plurality of classes, each class having a respective priority. In response to a determination that an aggregate bandwidth of the group of user sessions for a first frame time exceeds a specified budget, bandwidth is allocated for the group of user sessions during the first frame time in accordance with the class priorities. The group of user sessions is multiplexed (Continued)

onto a channel corresponding to the modulator in accordance with the allocated bandwidth and transmitted over a managed network.

20 Claims, 16 Drawing Sheets

(51) Int. Cl.
    *H04L 12/24*     (2006.01)
    *H04L 12/873*     (2013.01)
    *H04N 21/2365*     (2011.01)
    *H04N 21/24*     (2011.01)
    *H04N 21/236*     (2011.01)
    *H04N 21/2368*     (2011.01)
    *H04N 21/2381*     (2011.01)
    *H04N 21/61*     (2011.01)
    *H04N 21/647*     (2011.01)
    *H04L 12/851*     (2013.01)

(52) U.S. Cl.
    CPC ..... *H04N 21/2365* (2013.01); *H04N 21/2368* (2013.01); *H04N 21/2381* (2013.01); *H04N 21/23614* (2013.01); *H04N 21/23655* (2013.01); *H04N 21/2402* (2013.01); *H04N 21/6118* (2013.01); *H04N 21/6125* (2013.01); *H04N 21/64792* (2013.01); *H04L 47/24* (2013.01)

(56) References Cited

U.S. PATENT DOCUMENTS

| | | |
|---|---|---|
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweedy et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |
| 5,060,262 A | 10/1991 | Bevins, Jr. et al. |
| 5,077,607 A | 12/1991 | Johnson et al. |
| 5,083,800 A | 1/1992 | Lockton |

(56) References Cited

U.S. PATENT DOCUMENTS

| | | |
|---|---|---|
| 5,088,111 A | 2/1992 | McNamara et al. |
| 5,093,718 A | 3/1992 | Hoarty et al. |
| 5,109,414 A | 4/1992 | Harvey et al. |
| 5,113,496 A | 5/1992 | McCalley et al. |
| 5,119,188 A | 6/1992 | McCalley et al. |
| 5,130,792 A | 7/1992 | Tindell et al. |
| 5,132,992 A | 7/1992 | Yurt et al. |
| 5,133,009 A | 7/1992 | Rumreich |
| 5,133,079 A | 7/1992 | Ballantyne et al. |
| 5,136,411 A | 8/1992 | Paik et al. |
| 5,142,575 A | 8/1992 | Farmer et al. |
| 5,155,591 A | 10/1992 | Wachob |
| 5,172,413 A | 12/1992 | Bradley et al. |
| 5,191,410 A | 3/1993 | McCalley et al. |
| 5,195,092 A | 3/1993 | Wilson et al. |
| 5,208,665 A | 5/1993 | McCalley et al. |
| 5,220,420 A | 6/1993 | Hoarty et al. |
| 5,230,019 A | 7/1993 | Yanagimichi et al. |
| 5,231,494 A | 7/1993 | Wachob |
| 5,236,199 A | 8/1993 | Thompson, Jr. |
| 5,247,347 A | 9/1993 | Litteral et al. |
| 5,253,341 A | 10/1993 | Rozmanith et al. |
| 5,262,854 A | 11/1993 | Ng |
| 5,262,860 A | 11/1993 | Fitzpatrick et al. |
| 5,303,388 A | 4/1994 | Kreitman et al. |
| 5,319,455 A | 6/1994 | Hoarty et al. |
| 5,319,707 A | 6/1994 | Wasilewski et al. |
| 5,321,440 A | 6/1994 | Yanagihara et al. |
| 5,321,514 A | 6/1994 | Martinez |
| 5,351,129 A | 9/1994 | Lai |
| 5,355,162 A | 10/1994 | Yazolino et al. |
| 5,359,601 A | 10/1994 | Wasilewski et al. |
| 5,361,091 A | 11/1994 | Hoarty et al. |
| 5,371,532 A | 12/1994 | Gelman et al. |
| 5,404,393 A | 4/1995 | Remillard |
| 5,408,274 A | 4/1995 | Chang et al. |
| 5,410,343 A | 4/1995 | Coddington et al. |
| 5,410,344 A | 4/1995 | Graves et al. |
| 5,412,415 A | 5/1995 | Cook et al. |
| 5,412,720 A | 5/1995 | Hoarty |
| 5,418,559 A | 5/1995 | Blahut |
| 5,422,674 A | 6/1995 | Hooper et al. |
| 5,422,887 A | 6/1995 | Diepstraten et al. |
| 5,442,389 A | 8/1995 | Blahut et al. |
| 5,442,390 A | 8/1995 | Hooper et al. |
| 5,442,700 A | 8/1995 | Snell et al. |
| 5,446,490 A | 8/1995 | Blahut et al. |
| 5,469,283 A | 11/1995 | Vinel et al. |
| 5,469,431 A | 11/1995 | Wendorf et al. |
| 5,471,263 A | 11/1995 | Odaka |
| 5,481,542 A | 1/1996 | Logston et al. |
| 5,485,197 A | 1/1996 | Hoarty |
| 5,487,066 A | 1/1996 | McNamara et al. |
| 5,493,638 A | 2/1996 | Hooper et al. |
| 5,495,283 A | 2/1996 | Cowe |
| 5,495,295 A | 2/1996 | Long |
| 5,497,187 A | 3/1996 | Banker et al. |
| 5,517,250 A | 5/1996 | Hoogenboom et al. |
| 5,526,034 A | 6/1996 | Hoarty et al. |
| 5,528,281 A | 6/1996 | Grady et al. |
| 5,537,397 A | 7/1996 | Abramson |
| 5,537,404 A | 7/1996 | Bentley et al. |
| 5,539,449 A | 7/1996 | Blahut et al. |
| RE35,314 E | 8/1996 | Logg |
| 5,548,340 A | 8/1996 | Bertram |
| 5,550,578 A | 8/1996 | Hoarty et al. |
| 5,557,316 A | 9/1996 | Hoarty et al. |
| 5,559,549 A | 9/1996 | Hendricks et al. |
| 5,561,708 A | 10/1996 | Remillard |
| 5,570,126 A | 10/1996 | Blahut et al. |
| 5,570,363 A | 10/1996 | Holm |
| 5,579,143 A | 11/1996 | Huber |
| 5,581,653 A | 12/1996 | Todd |
| 5,583,927 A | 12/1996 | Ely et al. |
| 5,587,734 A | 12/1996 | Lauder et al. |
| 5,589,885 A | 12/1996 | Ooi |
| 5,592,470 A | 1/1997 | Rudrapatna et al. |
| 5,594,507 A | 1/1997 | Hoarty |
| 5,594,723 A | 1/1997 | Tibi |
| 5,594,938 A | 1/1997 | Engel |
| 5,596,693 A | 1/1997 | Needle et al. |
| 5,600,364 A | 2/1997 | Hendricks et al. |
| 5,600,573 A | 2/1997 | Hendricks et al. |
| 5,608,446 A | 3/1997 | Carr et al. |
| 5,617,145 A | 4/1997 | Huang et al. |
| 5,621,464 A | 4/1997 | Teo et al. |
| 5,625,404 A | 4/1997 | Grady et al. |
| 5,630,757 A | 5/1997 | Gagin et al. |
| 5,631,693 A | 5/1997 | Wunderlich et al. |
| 5,631,846 A | 5/1997 | Szurkowski |
| 5,632,003 A | 5/1997 | Davidson et al. |
| 5,649,283 A | 7/1997 | Galler et al. |
| 5,668,592 A | 9/1997 | Spaulding, II |
| 5,668,599 A | 9/1997 | Cheney et al. |
| 5,708,767 A | 1/1998 | Yeo et al. |
| 5,710,815 A | 1/1998 | Ming et al. |
| 5,712,906 A | 1/1998 | Grady et al. |
| 5,740,307 A | 4/1998 | Lane |
| 5,748,234 A | 5/1998 | Lippincott |
| 5,754,941 A | 5/1998 | Sharpe et al. |
| 5,786,527 A | 7/1998 | Tarte |
| 5,790,174 A | 8/1998 | Richard, III et al. |
| 5,802,283 A | 9/1998 | Grady et al. |
| 5,812,665 A | 9/1998 | Hoarty et al. |
| 5,812,786 A | 9/1998 | Seazholtz et al. |
| 5,815,604 A | 9/1998 | Simons et al. |
| 5,818,438 A | 10/1998 | Howe et al. |
| 5,821,945 A | 10/1998 | Yeo et al. |
| 5,822,537 A | 10/1998 | Katseff et al. |
| 5,828,371 A | 10/1998 | Cline et al. |
| 5,844,594 A | 12/1998 | Ferguson |
| 5,845,083 A | 12/1998 | Hamadani et al. |
| 5,862,325 A | 1/1999 | Reed et al. |
| 5,864,820 A | 1/1999 | Case |
| 5,867,208 A | 2/1999 | McLaren |
| 5,883,661 A | 3/1999 | Hoarty |
| 5,903,727 A | 5/1999 | Nielsen |
| 5,903,816 A | 5/1999 | Broadwin et al. |
| 5,905,522 A | 5/1999 | Lawler |
| 5,907,681 A | 5/1999 | Bates et al. |
| 5,917,822 A | 6/1999 | Lyles et al. |
| 5,946,352 A | 8/1999 | Rowlands et al. |
| 5,952,943 A | 9/1999 | Walsh et al. |
| 5,961,603 A | 10/1999 | Kunkel et al. |
| 5,963,203 A | 10/1999 | Goldberg et al. |
| 5,966,163 A | 10/1999 | Lin et al. |
| 5,978,756 A | 11/1999 | Walker et al. |
| 5,982,445 A | 11/1999 | Eyer et al. |
| 5,990,862 A | 11/1999 | Lewis |
| 5,995,146 A | 11/1999 | Rasmussen |
| 5,995,488 A | 11/1999 | Kalkunte et al. |
| 5,999,970 A | 12/1999 | Krisbergh et al. |
| 6,014,416 A | 1/2000 | Shin et al. |
| 6,021,386 A | 2/2000 | Davis et al. |
| 6,031,989 A | 2/2000 | Cordell |
| 6,034,678 A | 3/2000 | Hoarty et al. |
| 6,049,539 A | 4/2000 | Lee et al. |
| 6,049,831 A | 4/2000 | Gardell et al. |
| 6,052,555 A | 4/2000 | Ferguson |
| 6,055,314 A | 4/2000 | Spies et al. |
| 6,055,315 A | 4/2000 | Doyle et al. |
| 6,064,377 A | 5/2000 | Hoarty et al. |
| 6,078,328 A | 6/2000 | Schumann et al. |
| 6,084,908 A | 7/2000 | Chiang et al. |
| 6,100,883 A | 8/2000 | Hoarty |
| 6,108,625 A | 8/2000 | Kim |
| 6,115,076 A | 9/2000 | Linzer |
| 6,141,645 A | 10/2000 | Chi-Min et al. |
| 6,141,693 A | 10/2000 | Perlman et al. |
| 6,144,698 A | 11/2000 | Poon et al. |
| 6,167,084 A | 12/2000 | Wang et al. |
| 6,177,931 B1 | 1/2001 | Alexander et al. |
| 6,182,072 B1 | 1/2001 | Leak et al. |
| 6,184,878 B1 | 2/2001 | Alonso et al. |

(56) References Cited

U.S. PATENT DOCUMENTS

| | | |
|---|---|---|
| 6,192,081 B1 | 2/2001 | Chiang et al. |
| 6,198,822 B1 | 3/2001 | Doyle et al. |
| 6,205,582 B1 | 3/2001 | Hoarty |
| 6,226,041 B1 | 5/2001 | Florencio et al. |
| 6,236,730 B1 | 5/2001 | Cowieson et al. |
| 6,243,418 B1 | 6/2001 | Kim |
| 6,253,238 B1 | 6/2001 | Lauder et al. |
| 6,256,047 B1 | 7/2001 | Isobe et al. |
| 6,266,369 B1 | 7/2001 | Wang et al. |
| 6,268,864 B1 | 7/2001 | Chen et al. |
| 6,275,496 B1 | 8/2001 | Burns et al. |
| 6,292,194 B1 | 9/2001 | Powell, III |
| 6,305,020 B1 | 10/2001 | Hoarty et al. |
| 6,317,151 B1 | 11/2001 | Ohsuga et al. |
| 6,317,885 B1 | 11/2001 | Fries |
| 6,349,284 B1 | 2/2002 | Park et al. |
| 6,386,980 B1 | 5/2002 | Nishino et al. |
| 6,389,075 B2 | 5/2002 | Wang et al. |
| 6,446,037 B1 | 9/2002 | Fielder et al. |
| 6,459,427 B1 | 10/2002 | Mao et al. |
| 6,480,210 B1 | 11/2002 | Martino et al. |
| 6,481,012 B1 | 11/2002 | Gordon et al. |
| 6,512,793 B1 | 1/2003 | Maeda |
| 6,536,043 B1 | 3/2003 | Guedalia |
| 6,557,041 B2 | 4/2003 | Mallart |
| 6,560,496 B1 | 5/2003 | Michener |
| 6,564,378 B1 | 5/2003 | Satterfield et al. |
| 6,579,184 B1 | 6/2003 | Tanskanen |
| 6,614,442 B1 | 9/2003 | Ouyang et al. |
| 6,625,574 B1 | 9/2003 | Taniguchi et al. |
| 6,645,076 B1 | 11/2003 | Sugai |
| 6,657,647 B1 | 12/2003 | Bright |
| 6,675,385 B1 | 1/2004 | Wang |
| 6,675,387 B1 | 1/2004 | Boucher et al. |
| 6,687,663 B1 | 2/2004 | McGrath et al. |
| 6,717,600 B2 | 4/2004 | Dutta et al. |
| 6,721,956 B2 | 4/2004 | Wsilewski |
| 6,727,929 B1 | 4/2004 | Bates et al. |
| 6,731,605 B1 | 5/2004 | Deshpande |
| 6,747,991 B1 | 6/2004 | Hemy et al. |
| 6,754,271 B1 | 6/2004 | Gordon et al. |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,813,690 B1 | 11/2004 | Lango et al. |
| 6,817,947 B2 | 11/2004 | Tanskanen |
| 6,886,178 B1 | 4/2005 | Mao et al. |
| 6,907,574 B2 | 6/2005 | Xu et al. |
| 6,931,291 B1 | 8/2005 | Alvarez-Tinoco et al. |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,016,540 B1 | 3/2006 | Gong et al. |
| 7,031,385 B1 | 4/2006 | Inoue et al. |
| 7,050,113 B2 | 5/2006 | Campisano et al. |
| 7,089,577 B1 | 8/2006 | Rakib et al. |
| 7,093,028 B1 | 8/2006 | Shao et al. |
| 7,095,402 B2 | 8/2006 | Kunil et al. |
| 7,114,167 B2 | 9/2006 | Slemmer et al. |
| 7,151,782 B1 | 12/2006 | Oz et al. |
| 7,158,676 B1 | 1/2007 | Rainsford |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 | 12/2007 | Baar et al. |
| 7,325,043 B1 | 1/2008 | Rosenberg et al. |
| 7,346,111 B2 | 3/2008 | Winger et al. |
| 7,412,423 B1 | 8/2008 | Asano |
| 7,412,505 B2 | 8/2008 | Slemmer et al. |
| 7,421,082 B2 | 9/2008 | Kamiya et al. |
| 7,444,306 B2 | 10/2008 | Varble |
| 7,500,235 B2 | 3/2009 | Maynard et al. |
| 7,508,941 B1 | 3/2009 | O'Toole, Jr. et al. |
| 7,512,577 B2 | 3/2009 | Slemmer et al. |
| 7,596,764 B2 | 9/2009 | Vienneau et al. |
| 7,623,575 B2 | 11/2009 | Winger |
| 7,669,220 B2 | 2/2010 | Goode |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,830,388 B1 | 11/2010 | Lu |
| 7,936,819 B2 | 5/2011 | Craig et al. |
| 7,941,645 B1 | 5/2011 | Riach et al. |
| 7,945,616 B2 | 5/2011 | Zeng et al. |
| 7,987,489 B2 | 7/2011 | Krzyzanowski et al. |
| 8,027,353 B2 | 9/2011 | Damola et al. |
| 8,036,271 B2 | 10/2011 | Winger et al. |
| 8,046,798 B1 | 10/2011 | Schlack et al. |
| 8,074,248 B2 | 12/2011 | Sigmon et al. |
| 8,078,603 B1 | 12/2011 | Chandratillake et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,270,439 B2 | 9/2012 | Herr et al. |
| 8,284,842 B2 | 10/2012 | Craig et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,656,430 B2 | 2/2014 | Doyle |
| 8,781,240 B2 | 7/2014 | Srinivasan et al. |
| 8,839,317 B1 * | 9/2014 | Rieger ............... H04N 21/2408 375/240.01 |
| 9,204,113 B1 | 12/2015 | Kwok |
| 2001/0005360 A1 | 6/2001 | Lee |
| 2001/0008845 A1 | 7/2001 | Kusuda et al. |
| 2001/0043215 A1 | 11/2001 | Middleton, III et al. |
| 2001/0049301 A1 | 12/2001 | Masuda et al. |
| 2002/0007491 A1 | 1/2002 | Schiller et al. |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0054578 A1 | 5/2002 | Zhang et al. |
| 2002/0056083 A1 | 5/2002 | Istvan |
| 2002/0056107 A1 | 5/2002 | Schlack |
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0091738 A1 | 7/2002 | Rohrabaugh |
| 2002/0095689 A1 | 7/2002 | Novak |
| 2002/0105531 A1 | 8/2002 | Niemi |
| 2002/0108121 A1 | 8/2002 | Alao et al. |
| 2002/0131511 A1 | 9/2002 | Zenoni |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0196746 A1 | 12/2002 | Allen |
| 2003/0005452 A1 | 1/2003 | Rodriguez |

(56) References Cited

U.S. PATENT DOCUMENTS

| | | |
|---|---|---|
| 2003/0020671 A1 | 1/2003 | Santoro et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0066093 A1 | 4/2003 | Cruz-Rivera et al. |
| 2003/0071792 A1 | 4/2003 | Safadi |
| 2003/0072372 A1 | 4/2003 | Shen et al. |
| 2003/0088328 A1 | 5/2003 | Nishio et al. |
| 2003/0088400 A1 | 5/2003 | Nishio et al. |
| 2003/0107443 A1 | 6/2003 | Yamamoto |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi |
| 2003/0126611 A1 | 7/2003 | Chernock et al. |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0055007 A1 | 3/2004 | Allport |
| 2004/0073924 A1 | 4/2004 | Pendakur |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1 | 6/2004 | Baldwin et al. |
| 2004/0128686 A1 | 7/2004 | Boyer et al. |
| 2004/0133704 A1 | 7/2004 | Krzyzanowski et al. |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0261106 A1 | 12/2004 | Hoffman |
| 2004/0261114 A1 | 12/2004 | Addington et al. |
| 2004/0268419 A1 | 12/2004 | Danker et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1 | 5/2005 | Coleman et al. |
| 2005/0114906 A1 | 5/2005 | Hoarty et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0155063 A1 | 7/2005 | Bayrakeri |
| 2005/0160088 A1 | 7/2005 | Scallan et al. |
| 2005/0166257 A1 | 7/2005 | Feinleib et al. |
| 2005/0177853 A1 | 8/2005 | Williams et al. |
| 2005/0180502 A1 | 8/2005 | Puri |
| 2005/0216933 A1 | 9/2005 | Black |
| 2005/0216940 A1 | 9/2005 | Black |
| 2005/0226426 A1 | 10/2005 | Oomen et al. |
| 2005/0273832 A1 | 12/2005 | Zigmond et al. |
| 2005/0283741 A1 | 12/2005 | Balabanovic et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0026663 A1 | 2/2006 | Kortum et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0064716 A1 | 3/2006 | Sull et al. |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0161538 A1 | 7/2006 | Kiilerich |
| 2006/0173985 A1 | 8/2006 | Moore |
| 2006/0174289 A1 | 8/2006 | Theberge |
| 2006/0195884 A1 | 8/2006 | van Zoest et al. |
| 2006/0203913 A1 | 9/2006 | Kim et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0242570 A1 | 10/2006 | Croft et al. |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig |
| 2007/0011702 A1 | 1/2007 | Vaysman |
| 2007/0074251 A1 | 3/2007 | Oguz et al. |
| 2007/0115941 A1 | 5/2007 | Patel et al. |
| 2007/0124282 A1 | 5/2007 | Wittkotter |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0152984 A1 | 7/2007 | Ordin et al. |
| 2007/0162953 A1 | 7/2007 | Bolliger et al. |
| 2007/0172061 A1 | 7/2007 | Pinder |
| 2007/0174790 A1 | 7/2007 | Jing et al. |
| 2007/0180047 A1 | 8/2007 | Dong et al. |
| 2007/0192798 A1 | 8/2007 | Morgan |
| 2007/0234220 A1 | 10/2007 | Khan et al. |
| 2007/0237232 A1 | 10/2007 | Chang et al. |
| 2007/0300280 A1 | 12/2007 | Turner et al. |
| 2008/0034306 A1 | 2/2008 | Ording |
| 2008/0046928 A1 | 2/2008 | Poling et al. |
| 2008/0052742 A1 | 2/2008 | Kopf et al. |
| 2008/0060034 A1 | 3/2008 | Egnal et al. |
| 2008/0066135 A1 | 3/2008 | Brodersen et al. |
| 2008/0084503 A1 | 4/2008 | Kondo |
| 2008/0086688 A1 | 4/2008 | Chandratillake et al. |
| 2008/0086747 A1 | 4/2008 | Rasanen et al. |
| 2008/0094368 A1 | 4/2008 | Ording et al. |
| 2008/0097953 A1 | 4/2008 | Levy et al. |
| 2008/0098450 A1 | 4/2008 | Wu et al. |
| 2008/0104520 A1 | 5/2008 | Swenson et al. |
| 2008/0127255 A1 | 5/2008 | Ress et al. |
| 2008/0144711 A1 | 6/2008 | Chui et al. |
| 2008/0154583 A1 | 6/2008 | Goto et al. |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0178125 A1 | 7/2008 | Elsbree et al. |
| 2008/0178243 A1 | 7/2008 | Dong et al. |
| 2008/0178249 A1 | 7/2008 | Gordon et al. |
| 2008/0181221 A1 | 7/2008 | Kampmann et al. |
| 2008/0184120 A1 | 7/2008 | O-Brien-Strain et al. |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0222199 A1 | 9/2008 | Tiu et al. |
| 2008/0232452 A1 | 9/2008 | Sullivan et al. |
| 2008/0243918 A1 | 10/2008 | Holtman |
| 2008/0253440 A1 | 10/2008 | Srinivasan et al. |
| 2008/0253685 A1 | 10/2008 | Kuranov et al. |

(56) References Cited

U.S. PATENT DOCUMENTS

| | | |
|---|---|---|
| 2008/0271080 A1 | 10/2008 | Gossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Slemmer et al. |
| 2009/0132942 A1 | 5/2009 | Santoro et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172757 A1 | 7/2009 | Aldrey et al. |
| 2009/0178098 A1 | 7/2009 | Westbrook et al. |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1 | 8/2009 | Beverley et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0328109 A1 | 12/2009 | Pavlovskaia et al. |
| 2010/0009623 A1* | 1/2010 | Hennenhoefer ........ H04H 20/63 455/3.01 |
| 2010/0033638 A1 | 2/2010 | O'Donnell et al. |
| 2010/0035682 A1 | 2/2010 | Gentile et al. |
| 2010/0058404 A1 | 3/2010 | Rouse |
| 2010/0067571 A1 | 3/2010 | White et al. |
| 2010/0073371 A1 | 3/2010 | Ernst et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131996 A1 | 5/2010 | Gauld |
| 2010/0146139 A1 | 6/2010 | Brockmann |
| 2010/0158109 A1 | 6/2010 | Dahlby et al. |
| 2010/0161825 A1 | 6/2010 | Ronca et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1 | 8/2010 | Chou |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1 | 9/2010 | DeLuca et al. |
| 2010/0254370 A1 | 10/2010 | Jana et al. |
| 2010/0265344 A1 | 10/2010 | Velarde et al. |
| 2010/0325655 A1 | 12/2010 | Perez |
| 2010/0325668 A1 | 12/2010 | Young et al. |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0072474 A1* | 3/2011 | Springer ............ H04N 7/17318 725/95 |
| 2011/0099594 A1 | 4/2011 | Chen et al. |
| 2011/0107375 A1 | 5/2011 | Stahl et al. |
| 2011/0110433 A1 | 5/2011 | Bjontegaard |
| 2011/0110642 A1 | 5/2011 | Salomons et al. |
| 2011/0150421 A1 | 6/2011 | Sasaki et al. |
| 2011/0153776 A1 | 6/2011 | Opala et al. |
| 2011/0167468 A1 | 7/2011 | Lee et al. |
| 2011/0191684 A1 | 8/2011 | Greenberg |
| 2011/0231878 A1 | 9/2011 | Hunter et al. |
| 2011/0258584 A1 | 10/2011 | Williams et al. |
| 2011/0283304 A1 | 11/2011 | Roberts et al. |
| 2011/0289536 A1 | 11/2011 | Poder et al. |
| 2011/0296312 A1 | 12/2011 | Boyer et al. |
| 2011/0317982 A1 | 12/2011 | Xu et al. |
| 2012/0008786 A1 | 1/2012 | Cronk et al. |
| 2012/0023126 A1 | 1/2012 | Jin et al. |
| 2012/0023250 A1 | 1/2012 | Chen et al. |
| 2012/0030212 A1 | 2/2012 | Koopmans et al. |
| 2012/0030706 A1 | 2/2012 | Hulse et al. |
| 2012/0137337 A1 | 5/2012 | Sigmon et al. |
| 2012/0204217 A1 | 8/2012 | Regis et al. |
| 2012/0209815 A1 | 8/2012 | Carson et al. |
| 2012/0216232 A1 | 8/2012 | Chen et al. |
| 2012/0221853 A1 | 8/2012 | Wingert et al. |
| 2012/0257671 A1 | 10/2012 | Brockmann et al. |
| 2012/0284753 A1 | 11/2012 | Roberts et al. |
| 2013/0003826 A1 | 1/2013 | Craig et al. |
| 2013/0047074 A1 | 2/2013 | Vestergaard et al. |
| 2013/0071095 A1 | 3/2013 | Chauvier et al. |
| 2013/0086610 A1 | 4/2013 | Brockmann |
| 2013/0179787 A1 | 7/2013 | Brockmann et al. |
| 2013/0198776 A1 | 8/2013 | Brockmann |
| 2013/0254308 A1 | 9/2013 | Rose et al. |
| 2013/0272394 A1 | 10/2013 | Brockmann et al. |
| 2013/0304818 A1 | 11/2013 | Brumleve et al. |
| 2013/0305051 A1 | 11/2013 | Fu et al. |
| 2014/0032635 A1 | 1/2014 | Pimmel et al. |
| 2014/0033036 A1 | 1/2014 | Gaur et al. |
| 2014/0081954 A1 | 3/2014 | Elizarov |
| 2014/0223307 A1 | 8/2014 | McIntosh et al. |
| 2014/0223482 A1 | 8/2014 | McIntosh et al. |
| 2014/0267074 A1 | 9/2014 | Balci |
| 2014/0269930 A1 | 9/2014 | Robinson et al. |
| 2014/0289627 A1 | 9/2014 | Brockmann et al. |
| 2014/0317532 A1* | 10/2014 | Ma ........................ G06F 9/4443 715/753 |
| 2014/0344861 A1 | 11/2014 | Berner et al. |
| 2015/0195525 A1 | 7/2015 | Sullivan et al. |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 620735 B2 | 2/1992 |
| AU | 643828 B2 | 11/1993 |
| AU | 2004253127 A1 | 1/2005 |
| AU | 2005278122 A1 | 3/2006 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |

(56) References Cited

FOREIGN PATENT DOCUMENTS

| | | | |
|---|---|---|---|
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |
| CN | 103647980 A | 3/2014 |
| DE | 4408355 A1 | 10/1994 |
| DE | 69516139 D1 | 12/2000 |
| DE | 69132518 D1 | 9/2001 |
| DE | 69333207 D1 | 7/2004 |
| DE | 98961961 T1 | 8/2007 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0 881 808 A2 | 12/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1725044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2304953 A2 | 4/2011 |
| EP | 2364019 A2 | 9/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2378345 | 2/2003 |
| HK | 1134855 A1 | 10/2010 |
| HK | 1116323 A1 | 12/2010 |
| IE | 19913397 A1 | 4/1992 |
| IL | 99586 A | 2/1998 |
| IN | 180215 B | 1/1998 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 7-160292 A | 6/1995 |
| JP | 8-265704 A | 10/1996 |
| JP | 10-228437 A | 8/1998 |
| JP | 11-134273 A | 5/1999 |
| JP | H11-261966 | 9/1999 |
| JP | 2001-145112 A | 5/2001 |
| JP | 2001-203995 A | 7/2001 |
| JP | 2001-245271 | 9/2001 |
| JP | 2001-245291 | 9/2001 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-300556 A | 10/2002 |
| JP | 2002-319991 | 10/2002 |
| JP | 2003-506763 A | 2/2003 |
| JP | 2003-087673 | 3/2003 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-312283 | 11/2004 |
| JP | 2004-533736 A | 11/2004 |
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-123981 A | 5/2005 |
| JP | 2005-156996 | 6/2005 |
| JP | 2005-519382 | 6/2005 |
| JP | 2005-523479 A | 8/2005 |
| JP | 2005-260289 | 9/2005 |
| JP | 2005-309752 | 11/2005 |
| JP | 2006-067280 | 3/2006 |
| JP | 2006-246358 A | 9/2006 |
| JP | 2007-129296 | 5/2007 |
| JP | 2007-522727 | 8/2007 |
| JP | 11-88419 | 9/2007 |
| JP | 2007-264440 A | 10/2007 |
| JP | 2008-535622 A | 9/2008 |
| JP | 2009-159188 A | 7/2009 |
| JP | 2009-543386 A | 12/2009 |
| JP | 2012-080593 A | 4/2012 |
| KR | 10-2005-0001362 | 1/2005 |
| KR | 10-2005-0085827 | 8/2005 |
| KR | 10-2005-0095821 | 9/2006 |
| KR | 20080001298 A | 1/2008 |
| NL | 1032594 C2 | 4/2008 |
| NL | 1033929 C1 | 4/2008 |
| NL | 2004780 A | 1/2012 |
| NZ | 239969 A | 12/1994 |
| PT | 99110 A | 12/1993 |
| WO | WO 8202303 A1 | 7/1982 |
| WO | WO 8908967 A1 | 9/1989 |

(56) References Cited

FOREIGN PATENT DOCUMENTS

| | | |
|---|---|---|
| WO | WO 90/13972 A1 | 11/1990 |
| WO | WO 93/22877 A2 | 11/1993 |
| WO | WO 9416534 A2 | 7/1994 |
| WO | WO 9419910 A1 | 9/1994 |
| WO | WO 9421079 A1 | 9/1994 |
| WO | WO 95/15658 A1 | 6/1995 |
| WO | WO 9532587 A1 | 11/1995 |
| WO | WO 9533342 A1 | 12/1995 |
| WO | WO 9614712 A1 | 5/1996 |
| WO | WO 9627843 A1 | 9/1996 |
| WO | WO 9631826 A1 | 10/1996 |
| WO | WO 9637074 A2 | 11/1996 |
| WO | WO 9642168 A1 | 12/1996 |
| WO | WO 9716925 A1 | 5/1997 |
| WO | WO 9733434 A1 | 9/1997 |
| WO | WO 9739583 A1 | 10/1997 |
| WO | WO 9826595 A1 | 6/1998 |
| WO | WO 99/04568 | 1/1999 |
| WO | WO 9900735 A1 | 1/1999 |
| WO | WO 9930496 A1 | 6/1999 |
| WO | WO 9930497 A1 | 6/1999 |
| WO | WO 9930500 A1 | 6/1999 |
| WO | WO 9930501 A1 | 6/1999 |
| WO | WO 9935840 A1 | 7/1999 |
| WO | WO 9941911 A1 | 8/1999 |
| WO | WO 9956468 A1 | 11/1999 |
| WO | WO 99/65232 A1 | 12/1999 |
| WO | WO 99/65243 A1 | 12/1999 |
| WO | WO 9966732 A1 | 12/1999 |
| WO | WO 0002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 A1 | 7/2000 |
| WO | WO 01/39494 A1 | 5/2001 |
| WO | WO 01/41447 A1 | 6/2001 |
| WO | WO 01/82614 A1 | 11/2001 |
| WO | WO 02/089487 A2 | 7/2002 |
| WO | WO 02/076097 A1 | 9/2002 |
| WO | WO 02/076099 A1 | 9/2002 |
| WO | WO 03/026232 A1 | 3/2003 |
| WO | WO 03/026275 A2 | 3/2003 |
| WO | WO 03/047710 A2 | 6/2003 |
| WO | WO 03/065683 A1 | 8/2003 |
| WO | WO 03/071727 A2 | 8/2003 |
| WO | WO 03/091832 A2 | 11/2003 |
| WO | WO 2004/012437 A2 | 2/2004 |
| WO | WO 2004/018060 A2 | 3/2004 |
| WO | WO2004/057609 A1 | 7/2004 |
| WO | WO 2004/073310 A1 | 8/2004 |
| WO | WO 2005/002215 A1 | 1/2005 |
| WO | WO 2005/053301 A2 | 6/2005 |
| WO | WO 2005/076575 | 8/2005 |
| WO | WO 2006/014362 A1 | 2/2006 |
| WO | WO 2006/022881 A1 | 3/2006 |
| WO | WO 2006/053305 | 5/2006 |
| WO | WO 2006/081634 A2 | 8/2006 |
| WO | WO 2006/105480 | 10/2006 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 |
| WO | WO 2007/018726 A2 | 2/2007 |
| WO | WO2008/044916 A1 | 4/2008 |
| WO | WO 2008/044916 A2 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO2009/038596 | 3/2009 |
| WO | WO 2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A2 | 5/2010 |
| WO | WO 2010/107954 A2 | 9/2010 |
| WO | WO 2011/014336 A1 | 2/2011 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | WO 2012/138660 A2 | 10/2012 |
| WO | WO 2013/106390 A1 | 7/2013 |
| WO | WO 2013/155310 A1 | 7/2013 |
| WO | WO2013/184604 A1 | 12/2013 |

OTHER PUBLICATIONS

ActiveVideo Networks BV, International Preliminary Report on Patentability, PCT/NL2011/050308, dated Sep. 6, 2011, 8 pgs.

ActiveVideo Networks BV, International Search Report and Written Opinion, PCT/NL2011/050308, dated Sep. 6, 2011, 8 pgs.

Activevideo Networks Inc., International Preliminary Report on Patentability, PCT/US2011/056355, dated Apr. 16, 2013, 4 pgs.

ActiveVideo Networks Inc., International Preliminary Report on Patentability, PCT/US2012/032010, dated Oct. 8, 2013, 4 pgs.

ActiveVideo Networks Inc., International Search Report and Written Opinion, PCT/US2011/056355, dated Apr. 13, 2012, 6 pgs.

ActiveVideo Networks Inc., International Search Report and Written Opinion, PCT/US2012/032010, dated Oct. 10, 2012, 6 pgs.

ActiveVideo Networks Inc., International Search Report and Written Opinion, PCT/US2013/020769, dated May 9, 2013, 9 pgs.

ActiveVideo Networks Inc., International Search Report and Written Opinion, PCT/US2013/036182, dated Jul. 29, 2013, 12 pgs.

ActiveVideo Networks, Inc., International Search Report and Written Opinion, PCT/US2009/032457, dated Jul. 22, 2009, 7 pgs.

ActiveVideo Networks Inc., Extended EP Search Rpt, Application No. 09820936-4, dated Oct. 26, 2012, 11 pgs.

ActiveVideo Networks Inc., Extended EP Search Rpt, Application No. 10754084-1, dated Jul. 24, 2012, 11 pgs.

ActiveVideo Networks Inc., Extended EP Search Rpt, Application No. 10841764.3, dated May 20, 2014, 16 pgs.

ActiveVideo Networks Inc., Extended EP Search Rpt, Application No. 11833486.1, dated Apr. 3, 2014, 6 pgs.

Annex C—Video buffering verifier, information technology—generic coding of moving pictures and associated audio information: video, Feb. 2000, 6 pgs.

Antonoff, Michael, "Interactive Television," Popular Science, Nov. 1992, 12 pages.

Avinity Systems B.V., Extended European Search Report, Application No. 12163713.6, dated Feb. 7, 2014, 10 pgs.

Avinity Systems B.V., Extended European Search Report, Application No. 12163712-8, dated Feb. 3, 2014, 10 pgs.

Benjelloun, A summation algorithm for MPEG-1 coded audio signals: a first step towards audio processed domain, Annals of Telecommunications, Get Laudisier, Paris, vol. 55, No. 3/04, Mar. 1, 2000, 9 pgs.

Broadhead, Direct manipulation of MPEG compressed digital audio, Nov. 5-9, 1995, 41 pgs.

Cable Television Laboratories, Inc., "CableLabs Asset Distribution Interface Specification, Version 1.1", May 5, 2006, 33 pgs.

CD 11172-3, Coding of moving pictures and associated audio for digital storage media at up to about 1.5 MBIT, Jan. 1, 1992, 39 pgs.

Craig, Notice of Allowance, U.S. Appl. No. 11/178,176, dated Dec. 23, 2010, 8 pgs.

Craig, Notice of Allowance, U.S. Appl. No. 11/178,183, dated Jan. 12, 2012, 7 pgs.

Craig, Notice of Allowance, U.S. Appl. No. 11/178,183, dated Jul. 19, 2012, 8 pgs.

(56) References Cited

OTHER PUBLICATIONS

Craig, Notice of Allowance, U.S. Appl. No. 11/178,189, dated Oct. 12, 2011, 7 pgs.
Craig, Notice of Allowance, U.S. Appl. No. 11/178,176, dated Mar. 23, 2011, 8 pgs.
Craig, Notice of Allowance, U.S. Appl. No. 13/609,183, dated Aug. 26, 2013, 8 pgs.
Craig, Final Office Action, U.S. Appl. No. 11/103,838, dated Feb. 5, 2009, 30 pgs.
Craig, Final Office Action, U.S. Appl. No. 11/178,181, dated Aug. 25, 2010, 17 pgs.
Craig, Final Office Action, U.S. Appl. No. 11/103,838, dated Jul. 6, 2010, 35 pgs.
Craig, Final Office Action, U.S. Appl. No. 11/178,176, dated Oct. 1, 2010, 8 pgs.
Craig, Final Office Action, U.S. Appl. No. 11/178,183, dated Apr. 13, 2011, 16 pgs.
Craig, Final Office Action, U.S. Appl. No. 11/178,177, dated Oct. 26, 2010, 12 pgs.
Craig, Final Office Action, U.S. Appl. No. 11/178,181, dated Jun. 20, 2011, 21 pgs.
Craig, Office Action, U.S. Appl. No. 11/103,838, dated May 12, 2009, 32 pgs.
Craig, Office Action, U.S. Appl. No. 11/103,838, dated Aug. 19, 2008, 17 pgs.
Craig, Final Office Action, U.S. Appl. No. 11/103,838, dated Nov. 19, 2009, 34 pgs.
Craig, Office Action, U.S. Appl. No. 11/178,176, dated May 6, 2010, 7 pgs.
Craig, Office-Action U.S. Appl. No. 11/178,177, dated Mar. 29, 2011, 15 pgs.
Craig, Office Action, U.S. Appl. No. 11/178,177, dated Aug. 3, 2011, 26 pgs.
Craig, Office Action, U.S. Appl. No. 11/178,177, dated Mar. 29, 2010, 11 pgs.
Craig, Office Action, U.S. Appl. No. 11/178,181, dated Feb. 11, 2011, 19 pgs.
Craig, Office Action, U.S. Appl. No. 11/178,181, dated Mar. 29, 2010, 10 pgs.
Craig, Office Action, U.S. Appl. No. 11/178,182, dated Feb. 23, 2010, 15 pgs.
Craig, Office Action, U.S. Appl. No. 11/178,183, dated Dec. 6, 2010, 12 pgs.
Craig, Office Action, U.S. Appl. No. 11/178,183, dated Sep. 15, 2011, 12 pgs.
Craig, Office Action, U.S. Appl. No. 11/178,183, dated Feb. 19, 2010, 17 pgs.
Craig, Office Action, U.S. Appl. No. 11/178,183, dated Jul. 20, 2010, 13 pgs.
Craig, Office Action, U.S. Appl. No. 11/178,189, dated Nov. 9, 2010, 13 pgs.
Craig, Office Action, U.S. Appl. No. 11/178,189, dated Mar. 15, 2010, 11 pgs.
Craig, Office Action, U.S. Appl. No. 11/178,189, dated Jul. 23, 2009, 10 pgs.
Craig, Office Action, U.S. Appl. No. 11/178,189, dated May 26, 2011, 14 pgs.
Craig, Office Action, U.S. Appl. No. 13/609,183, dated May 9, 2013, 7 pgs.
Pavlovskaia, Office Action, JP 2011-516499, dated Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.org, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, dated May 23, 2012, 5 pgs.
Herr, Notice of Allowance, U.S. Appl. No. 12/534,016, dated Feb. 7, 2012, 5 pgs.
Herr, Notice of Allowance, U.S. Appl. No. 12/534,016, dated Sep. 28, 2011, 15 pgs.
Herr, Final Office Action, U.S. Appl. No. 11/620,593, dated Sep. 15, 2011, 104 pgs.
Herr, Office Action, U.S. Appl. No. 11/620,593, dated Mar. 19, 2010, 58 pgs.
Herr, Office Action, U.S. Appl. No. 11/620,593, dated Apr. 21, 2009 27 pgs.
Herr, Office Action, U.S. Appl. No. 11/620,593, dated Dec. 23, 2009, 58 pgs.
Herr, Office Action, U.S. Appl. No. 11/620,593, dated Jan. 24, 2011, 96 pgs.
Herr, Office Action, U.S. Appl. No. 11/620,593, dated Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, dated Jan. 29, 2008, 9 pgs.
ICTV, Inc., International Search Report / Written Opinion, PCT/US2006/022585, dated Oct. 12, 2007, 15 pgs.
ICTV, Inc., International Search Report / Written Opinion, PCT/US2008/000419, dated May 15, 2009, 20 pgs.
ICTV, Inc., International Search Report / Written Opinion; PCT/US2006/022533, dated Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Images, 18 Computer Graphics (No. 3), Jul. 1984, pp. 253-259.
RSS Advisory Board, "RSS 2.0 Specification", published Oct. 15, 2007.
SAOC use cases, draft requirements and architecture, Oct. 2006, 16 pgs.
Sigmon, Final Office Action, U.S. Appl. No. 11/258,602, dated Feb. 23, 2009, 15 pgs.
Sigmon, Office Action, U.S. Appl. No. 11/258,602, dated Sep. 2, 2008, 12 pgs.
TAG Networks, Inc., Communication pursuant to Article 94(3) EPC, European Patent Application, 06773714.8, dated May 6, 2009, 3 pgs.
TAG Networks Inc, Decision to Grant a Patent, JP 2009-544985, dated Jun. 28, 2013, 1 pg.
TAG Networks Inc., IPRP, PCT/US2006/010080, dated Oct. 16, 2007, 6 pgs.
TAG Networks Inc., IPRP, PCT/US2006/024194, dated Jan. 10, 2008, 7 pgs.
TAG Networks Inc., IPRP, PCT/US2006/024195, dated Apr. 1, 2009, 11 pgs.
TAG Networks Inc., IPRP, PCT/US2006/024196, dated Jan. 10, 2008, 6 pgs.
TAG Networks Inc., International Search Report, PCT/US2008/050221, dated Jun. 12, 2008, 9 pgs.
TAG Networks Inc., Office Action, CN 200680017662.3, dated Apr. 26, 2010, 4 pgs.
TAG Networks Inc., Office Action, EP 06739032.8, dated Aug. 14, 2009, 4 pgs.
TAG Networks Inc., Office Action, EP 06773714.8, dated May 6, 2009, 3 pgs.
TAG Networks Inc., Office Action, EP 06773714.8, dated Jan. 12, 2010, 4 pgs.
TAG Networks Inc., Office Action, JP 2008-506474, dated Oct. 1, 2012, 5 pgs.
TAG Networks Inc., Office Action, JP 2008-506474, dated Aug. 8, 2011, 5 pgs.

(56) References Cited

OTHER PUBLICATIONS

TAG Networks Inc., Office Action, JP 2008-520254, dated Oct. 20, 2011, 2 pgs.
TAG Networks, IPRP, PCT/US2008/050221, dated Jul. 7, 2009, 6 pgs.
TAG Networks, International Search Report, PCT/US2010/041133, dated Oct. 19, 2010, 13 pgs.
TAG Networks, Office Action, CN 200880001325.4, dated Jun. 22, 2011, 4 pgs.
TAG Networks, Office Action, JP 2009-544985, dated Feb. 25, 2013, 3 pgs.
Talley, A general framework for continuous media transmission control, 21st IEEE Conference on Local Computer Networks, Oct. 13-16, 1996, 10 pgs.
The Toolame Project, Psych_nl.c, Oct. 1, 1999, 1 pg.
Todd, AC-3: flexible perceptual coding for audio transmission and storage, 96th Convention, Audio Engineering Society, Feb. 26-Mar. 1, 1994, 16 pgs.
Tudor, MPEG-2 Video Compression, Dec. 1995, 15 pgs.
TVHEAD, Inc. First Examination Report, in 1744/MUMNP/2007, dated Dec. 30, 2013, 6 pgs.
TVHEAD, Inc. International Search Report, PCT/US2006/010080, dated Jun. 20, 2006, 3 pgs.
TVHEAD, Inc. International Search Report, PCT/US2006/024194, dated Dec. 15, 2006, 4 pgs.
TVHEAD, Inc. International Search Report, PCT/US2006/024195, dated Nov. 29, 2006, 9 pgs.
TVHEAD, Inc. International Search Report, PCT/US2006/024196, dated Dec. 11, 2006, 4 pgs.
TVHEAD, Inc. International Search Report, PCT/US2006/024197, dated Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, IEEE International Conference on Multimedia and Expo, ICME, Aug. 22, 2001, 4 pgs.
Wang, A compressed domain beat detector using MP3 audio bitstream, Sep. 30, 2001, 9 pgs.
Wang, A multichannel audio coding algorithm for inter-channel redundancy removal, May 12-15, 2001, 6 pgs.
Wang, An excitation level based psychoacoustic model for audio compression, Oct. 30, 1999, 4 pgs.
Wang, Energy compaction property of the MDCT in comparison with other transforms, AES 109th Convention, Los Angeles, Sep. 22-25, 2000, 23 pgs.
Wang, Exploiting excess masking for audio compression, 17th International Conference on High Quality Audio Coding, Sep. 2-5, 1999, 4 pgs.
Wang, schemes for re-compressing mp3 audio bitstreams, Audio Engineering Society, 111th Convention Sep. 21-24, 2001, New York, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo Networks, Inc., International Preliminary Report on Patentablity, PCT/US2013/036182, dated Oct. 14, 2014, 9 pgs.
ActiveVideo Networks Inc., Communication Pursuant to Rule 94(3), EP08713106-6, dated Jun. 26, 2014, 5 pgs.
ActiveVideo Networks Inc., Communication Pursuant to Rule 94(3), EP09713486.0, dated Apr. 14, 2014, 6 pgs.
ActiveVideo Networks Inc., Communication Pursuant to Rules 70(2) and 70a(2), EP11833486.1, dated Apr. 24, 2014, 1 pg.
ActiveVideo Networks Inc., Communication Pursuant to Rules 161(2) & 162 EPC, EP13775121.0, dated Jan. 20, 2015, 3 pgs.
ActiveVideo Networks Inc., Examination Report No. 1, AU2011258972, dated Jul. 21, 2014, 3 pgs.
ActiveVideo Networks, Inc., International Search Report and Written Opinion, PCT/US2014/041430, dated Oct. 9, 2014, 9 pgs.

Active Video Networks, Notice of Reasons for Rejection, JP2012-547318, dated Sep. 26, 2014, 7 pgs.
ActiveVideo Networks Inc., Certificate of Patent JP5675765, dated Jan. 9, 2015, 3 pgs.
ActiveVideo Networks Inc., Decision to refuse a European patent application (Art. 97(2) EPC, EP09820936.4, dated Feb. 20, 2015, 4 pgs.
ActiveVideo Networks Inc., Communication Pursuant to Article 94(3) EPC, EP10754084.1, dated Feb. 10, 2015, 12 pgs.
ActiveVideo Networks Inc., Communication under Rule 71(3) EPC, Intention to Grant, EP08713106.6, dated Feb. 19, 2015, 12 pgs.
ActiveVideo Networks Inc., Examination Report No. 2, AU2011249132, dated May 29, 2015, 4 pgs.
Activevideo Networks Inc., Examination Report No. 2, AU2011315950, dated Jun. 25, 2015, 3 pgs.
ActiveVideo, International Search Report and Written Opinion, PCT/US2015/027803, dated Jun. 24, 2015, 18 pgs.
ActiveVideo, International Search Report and Written Opinion, PCT/US2015/027804, dated Jun. 25, 2015, 10 pgs.
ActiveVideo Networks B.V., Office Action, IL222830, dated Jun. 28, 2015, 7 pgs.
ActiveVideo Networks, Inc., Office Action, JP2013534034, dated Jun. 16, 2015, 6 pgs.
ActiveVideo Networks Inc., Notice of Reasons for Rejection, JP2014-100460, dated Jan. 15, 2015, 6 pgs.
ActiveVideo Networks Inc., Notice of Reasons for Rejection, JP2013-509016, dated Dec. 24, 2014, 11 pgs.
ActiveVideo Networks, Inc., Certificate of Grant, EP08713106.6-1908, dated Aug. 5, 2015, 2 pgs.
ActiveVideo Networks, Inc., Certificate of Grant, AU2011258972, dated Nov. 19, 2015, 2 pgs.
ActiveVideo Networks, Inc., Certificate of Grant, AU2011315950, dated Dec. 17, 2015, 2 pgs.
ActiveVideo Networks, Inc., Certificate of Grant, AU2011249132, dated Jan. 7, 2016, 2 pgs.
ActiveVideo Networks, Inc., Certificate of Grant, HK10102800.4, dated Jun. 10, 2016, 3 pgs.
ActiveVideo Networks, Inc., Certificate of Grant , EP13168509.11908, dated Sep. 30, 2015, 2 pgs.
ActiveVideo Networks, Inc., Certificate of Patent, JP2013534034, dated Jan. 8, 2016, 4 pgs.
ActiveVideo Networks, Inc., Certificate of Patent, IL215133, dated Mar. 31, 2016, 1 pg.
ActiveVideo Networks, Inc., Communication Pursuant to Rules 161(1) and 162 EPC, EP14722897.7, dated Oct. 28, 2015, 2 pgs.
ActiveVideo Networks, Inc., Communication Pursuant to Article 94(3) EPC, EP14722897.7, dated Jun. 29, 2016, 6 pgs.
ActiveVideo Networks, Inc., Communication Pursuant to Article 94(3) EPC, EP11738835.5, dated Jun. 10, 2016, 3 pgs.
ActiveVideo Networks, Inc., Communication Pursuant to Rules 161(1) and 162 EPC, EP14740004.8, dated Jan. 26, 2016, 2 pgs.
ActiveVideo Networks, Inc., Communication Pursuant to Rules 161(1) and 162 EPC, EP14736535.7, dated Jan. 26, 2016, 2 pgs.
ActiveVideo Networks, Inc., Decision to Grant, EP08713106.6-1908, dated Jul. 9, 2015, 2 pgs.
ActiveVideo Networks, Inc., Decision to Grant, EP13168509.1-1908, dated Sep. 3, 2015, 2 pgs.
ActiveVideo Networks, Inc., Decision to Grant, JP2014100460, dated Jul. 24, 2015, 5 pgs.
ActiveVideo Networks, Inc., Decision to Refuse a European Patent Application, EP08705578.6, dated Nov. 26, 2015, 10 pgs.
ActiveVideo Networks, Inc., Extended European Search Report, EP13735906.3, dated Nov. 11, 2015, 10 pgs.
ActiveVideo Networks, Inc., Partial Supplementary Extended European Search Report, EP13775121.0, dated Jun. 14, 2016, 7 pgs.
ActiveVideo Networks, Inc., KIPO's Notice of Preliminary Rejection, KR10-2010-7019512, dated Jul. 15, 2015, 15 pgs.
ActiveVideo Networks, Inc., KIPO's 2nd-Notice of Preliminary Rejection, KR10-2010-7019512, dated Feb. 12, 2016, 5 pgs.
ActiveVideo Networks, Inc., KIPO's Notice of Preliminary Rejection, KR10-20107021116, dated Jul. 13, 2015, 19 pgs.
ActiveVideo Networks, Inc., KIPO's Notice of Preliminary Rejection, KR10-2011-7024417, dated Feb. 18, 2016, 16 pgs.

(56) References Cited

OTHER PUBLICATIONS

ActiveVideo Networks, Inc., International Search Report and Written Opinion, PCT-US2015028072, dated Aug. 7, 2015, 9 pgs.
ActiveVideo Networks, Inc., International Preliminary Report on Patentability, PCT-US2014030773, dated Sep. 15, 2015, 6 pgs.
ActiveVideo Networks, Inc., International Preliminary Report on Patentability, PCT/US2014041430, dated Dec. 8, 2015, 6 pgs.
ActiveVideo Networks, Inc., International Preliminary Report on Patentability, PCT-US2014041416, dated Dec. 8, 2015, 6 pgs.
ActiveVideo Networks, Inc., International Search Report and Written Opinion, PCT/US2015/000502, dated May 6, 2016, 8 pgs.
ActiveVideo, Communication Pursuant to Article-94(3) EPC, EP12767642.7, dated Sep. 4, 2015, 4 pgs.
ActiveVideo, Communication Pursuant to Article 94(3) EPC, EP10841764.3, dated Dec. 18, 2015, 6 pgs. dated Dec. 18, 2015.
ActiveVideo Networks, Inc., Communication Pursuant to Rules 70(2) abd 70a(2) EP13735906.3, dated Nov. 27, 2015, 1 pg.
ActiveVideo, Notice of Reasons for Rejection, JP2013-509016, dated Dec. 3, 2015, 7 pgs.
ActiveVideo, Notice of German Patent, EP602008040474-9, dated Jan. 6, 2016, 4 pgs.
Avinity Systems B. V., Final Office Action, JP-2009-530298, dated Oct. 7, 2014, 8 pgs.
Avinity Systems B.V., Notice of Grant—JP2009530298, dated Apr. 12, 2016, 3 pgs.
Brockmann, Notice of Allowance, U.S. Appl. No. 13/445,104, dated Dec. 24, 2014, 14 pgs.
Brockmann, Final Office Action, U.S. Appl. No. 13/686,548, dated Sep. 24, 2014, 13 pgs.
Brockmann, Final Office Action, U.S. Appl. No. 13/438,617, dated Oct. 3, 2014, 19 pgs.
Brockmann, Office Action, U.S. Appl. No. 12/443,571, dated Nov. 5, 2014, 26 pgs.
Brockmann, Office Action, U.S. Appl. No. 13/668,004, dated Feb. 26, 2015, 17 pgs.
Brockmann, Office Action, U.S. Appl. No. 13/686,548, dated Jan. 5, 2015, 12 pgs.
Brockmann, Office Action, U.S. Appl. No. 13/911,948, dated Dec. 26, 2014, 12 pgs.
Brockmann, Office Action, U.S. Appl. No. 13/911,948, dated Jan. 29, 2015, 11 pgs.
Brockmann, Office Action, U.S. Appl. No. 13/737,097, dated Mar. 16, 2015, 18 pgs.
Brockmann, Notice of Allowance, U.S. Appl. No. 13/911,948, dated Jul. 10, 2015, 5 pgs.
Brockmann, Notice of Allowance, U.S. Appl. No. 14/298,796, dated Mar. 18, 2015, 11 pgs.
Brockmann, Notice of Allowance, U.S. Appl. No. 13/438,617, dated May 22, 2015, 18 pgs.
Brockmann, Notice of Allowance, U.S. Appl. No. 13/445,104, dated Apr. 23, 2015, 8 pgs.
Brockmann, Final Office Action, U.S. Appl. No. 12/443,571, dated Jul. 9, 2015, 28 pgs.
Brockmann, Office Action, U.S. Appl. No. 14/262,674, dated May 21, 2015, 7 pgs.
Brockmann, Notice of Allowance, U.S. Appl. No. 14/262,674, dated Sep. 30, 2015, 7 pgs.
Brockmann, Notice of Allowance, U.S. Appl. No. 13/911,948, dated Aug. 21, 2015, 6 pgs.
Brockmann, Notice of Allowance, U.S. Appl. No. 13/911,948, dated Aug. 5, 2015, 5 pgs.
Brockmann, Final Office Action, U.S. Appl. No. 13/668,004, dated Aug. 3, 2015, 18 pgs.
Brockmann, Office Action, U.S. Appl. No. 13/668,004, dated Mar. 25, 2016, 17 pgs.
Brockmann, Final Office Action, U.S. Appl. No. 13/686,548, dated Aug. 12, 2015, 13 pgs.
Brockmann, Office Action, U.S. Appl. No. 13/686,548, dated Feb. 8, 2016, 13 pgs.
Brockmann, Final Office Action, U.S. Appl. No. 13/737,097, dated Aug. 14, 2015, 17 pgs.
Brockmann, Office Action, U.S. Appl. No. 14/298,796, dated Sep. 11, 2015, 11 pgs.
Brockmann, Notice of Allowance, U.S. Appl. No. 14/298,796, dated Mar. 17, 2016, 9 pgs.
Brockmann, Final Office Action, U.S. Appl. No. 12/443,571, dated Aug. 1, 2016, 32 pgs.
Brockmann, Office Action, U.S. Appl. No. 12/443,571, dated Dec. 4, 2015, 30 pgs.
Craig, Decision on Appeal—Reversed-, U.S. Appl. No. 11/178,177, dated Feb. 25, 2015, 7 pgs.
Craig, Notice of Allowance, U.S. Appl. No. 11/178,177, dated Mar. 5, 2015, 7 pgs.
Craig, Notice of Allowance, U.S. Appl. No. 11/178,181, dated Feb. 13, 2015, 8 pgs.
Dahlby, Office Action, U.S. Appl. No. 12/651,203, dated Dec. 3, 2014, 19 pgs.
Dahlby, Office Action U.S. Appl. No. 12/651,203, dated Jul. 2, 2015, 25 pgs.
Dahlby, Final Office Action, U.S. Appl. No. 12/651,203, dated Dec. 11, 2015, 25 pgs.
Gecsei, J., "Adaptation in Distributed Multimedia Systems," IEEE Multimedia, IEEE Service Center, New York, NY, vol. 4, No. 2, Apr. 1, 1997, 10 pgs.
Gordon, Notice of Allowance, U.S. Appl. No. 12/008,697, dated Dec. 8, 2014, 10 pgs.
Gordon, Office Action, U.S. Appl. No. 12/008,722, dated Nov. 28, 2014, 18 pgs.
Gordon, Notice of Allowance, U.S. Appl. No. 12/008,697, dated Apr. 1, 2015, 10 pgs.
Gordon, Final Office Action, U.S. Appl. No. 12/008,722, dated Jul. 2, 2015, 20 pgs.
Gordon, Notice of Allowance, U.S. Appl. No. 12/008,722, dated Feb. 17, 2016, 10 pgs.
Jacob, Bruce, "Memory Systems: Cache, DRAM, Disk," Oct. 19, 2007, The Cache Layer, Chapter 22, p. 739.
Ohta, K., et al., "Selective Multimedia Access Protocol for Wireless Multimedia Communication," Communications, Computers and Signal Processing, 1997, IEEE Pacific Rim Conference NCE Victoria, BC, Canada, Aug. 1997, vol. 1, 4 pgs.
Regis, Notice of Allowance, U.S. Appl. No. 13/273,803, dated Nov. 18, 2014, 9 pgs.
Regis, Notice of Allowance, U.S. Appl. No. 13/273,803, dated Mar. 2, 2015, 8 pgs.
Sigmon, Notice of Allowance, U.S. Appl. No. 13/311,203, dated Dec. 19, 2014, 5 pgs.
Sigmon, Notice of Allowance, U.S. Appl. No. 13/311,203, dated Apr. 14, 2015, 5 pgs.
Tag Networks Inc, Decision to Grant a Patent, JP 2008-506474, dated Oct. 4, 2013, 5 pgs.
Wei, S., "QoS Tradeoffs Using an Application-Oriented Transport Protocol (AOTP) for Multimedia Applications Over IP." Sep. 23-26, 1999, Proceedings of the Third International Conference on Computational Intelligence and Multimedia Applications, New Delhi, India, 5 pgs.
ActiveVideo Networks, Inc., Certificate of Grant, HK14101604, dated Sep. 8, 2016, 4 pgs.
ActiveVideo Networks, Inc., Communication Pursuant to Rules 161(1) and 162 EPC, EP15785776.4, dated Dec. 8, 2016, 2 pgs.
ActiveVideo Networks, Inc., Communication Pursuant to Rules 161(1) and 162 EPC, EP15721482.6, dated Dec. 13, 2016, 2 pgs.
ActiveVideo Networks, Inc., Communication Pursuant to Rules 161(1) and 162 EPC, EP15721483.4, dated Dec. 15, 2016, 2 pgs.
ActiveVideo Networks, Inc., Communication Under Rule 71(3), Intention to Grant, EP11833486.1, dated Apr. 21, 2017, 7 pgs.
ActiveVideo Networks, Inc., Decision to Refuse an EP Patent Application, EP 10754084.1, dated Nov. 3, 2016, 4 pgs.
ActiveVideo Networks, Inc. Notice of Reasons for Rejection, JP2015-159309, dated Aug. 29, 2016, 11 pgs.
ActiveVideo Networks, Inc. Denial of Entry of Amendment, JP2013-509016, dated Aug. 30, 2016, 7 pgs.

(56) References Cited

OTHER PUBLICATIONS

ActiveVideo Networks, Inc. Notice of Final Rejection, JP2013-509016, dated Aug. 30, 2016, 3 pgs.
ActiveVideo Networks, Inc., KIPO's Notice of Preliminary Rejection, KR10-2012-7031648, dated Mar. 27, 2017, 3 pgs.
ActiveVideo Networks, Inc., International Preliminary Report on Patentability, PCT-US2015028072, dated Nov. 1, 2016, 7 pgs.
ActiveVideo Networks, Inc., International Preliminary Report on Patentability, PCT-US2015/027803, dated Oct. 25, 2016, 8 pgs.
ActiveVideo Networks, Inc., International Preliminary Report on Patentability, PCT-US2015/027804, dated Oct. 25, 2016, 6 pgs.
ActiveVideo Networks, Inc., International Search Report and Written Opinion, PCT/US2016/040547, dated Sep. 19, 2016, 6 pgs.
ActiveVideo Networks, Inc., International Search Report and Written Opinion, PCT/US2016/051283, dated Nov. 29, 2016, 10 pgs.
ActiveVideo Networks, Inc., Communication Pursuant to Article 94(3), EP13735906.3, dated Jul. 18, 2016, 5 pgs.
ActiveVideo, Intent to Grant, EP12767642.7, dated Jan. 2, 2017, 15 pgs.
Avinity Systems B.V., Decision to Refuse an EP Patent Application, EP07834561.8, dated Oct. 10, 2016, 17 pgs.
Brockmann, Final Office Action, U.S. Appl. No. 13/668,004, dated Nov. 2, 2016, 20 pgs.
Brockmann, Office Action, U.S. Appl. No. 13/668,004, dated Mar. 31, 2017, 21 pgs.
Brockmann, Office Action, U.S. Appl. No. 13/737,097, dated May 16, 2016, 23 pgs.
Brockmann, Final Office Action, U.S. Appl. No. 13/737,097, dated Oct. 20, 2016, 22 pgs.
Brockmann, Office Action, U.S. Appl. No. 14/217,108, dated Apr. 13, 2016, 8 pgs.
Brockmann, Office Action, U.S. Appl. No. 14/696,462, dated Feb. 8, 2017, 6 pgs.
Brockmann, Office Action, U.S. Appl. No. 15/139,166, dated Feb. 28, 2017, 10 pgs.
Brockmann, Final Office Action, U.S. Appl. No. 14/217,108, dated Dec. 1, 2016, 9 pgs.
Dahlby, Advisory Action, U.S. Appl. No. 12/651,203, dated Nov. 21, 2016, 5 pgs.
Hoeben, Office Action, U.S. Appl. No. 14/757,935, dated Sep. 23, 2016, 28 pgs.
Hoeben, Final Office Action, U.S. Appl. No. 14/757,935, dated Apr. 12, 2017, 29 pgs.
McElhatten, Office Action, U.S. Appl. No. 14/698,633, dated Feb. 22, 2016, 14 pgs.
McElhatten, Final Office Action, U.S. Appl. No. 14/698,633, dated Aug. 18, 2016, 16 pgs.
McElhatten, Office Action, U.S. Appl. No. 14/698,633, dated Feb. 10, 2017, 15 pgs.

\* cited by examiner

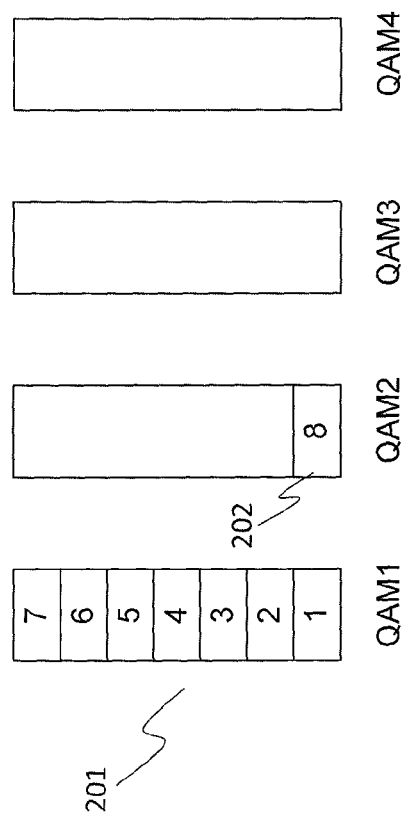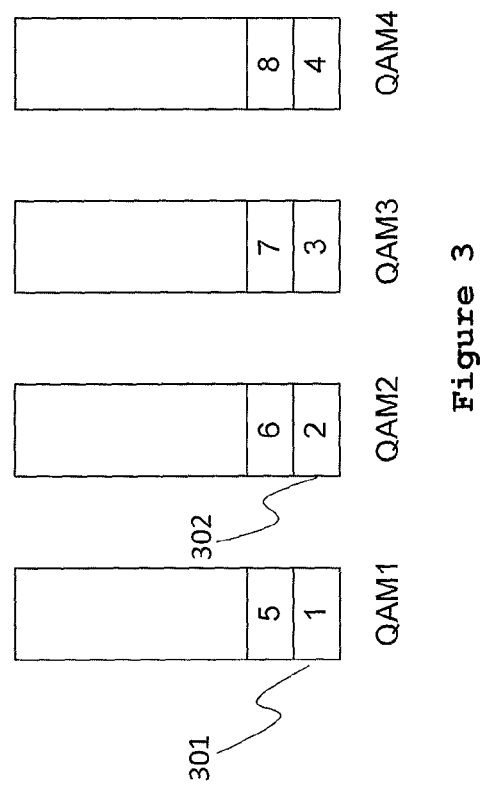

INTELLIGENT MULTIPLEXING USING CLASS-BASED, MULTI-DIMENSIONED DECISION LOGIC FOR MANAGED NETWORKS

RELATED APPLICATION

This application claims priority to U.S. Provisional Patent Application No. 61/984,697, titled "Intelligent Multiplexing Using Class-Based, Multi-Dimensioned Decision Logic for Managed and Unmanaged Networks," filed Apr. 25, 2014, which is incorporated by reference herein in its entirety.

TECHNICAL FIELD

The present disclosure generally pertains to cable television network technology, and particularly to adaptive and dynamic multiplexing techniques for traffic over various network topologies.

BACKGROUND

The delivery of digital television to the home was launched in earnest in 1995 for both cable television as well as satellite-delivery systems. This new technology enabled multi-channel video program distributors (MVPD) to provide far more television programming using available network bandwidth as compared to what had been possible using analog signals of the same programs. A plurality of digital television signals are combined to fit multiple digital channels into the space of one legacy analog channel via a process called "multiplexing." When television programs were digitally encoded at a fixed bit rate (called Constant Bit Rate or 'CBR'), then the early digital cable TV systems could carry perhaps six to eight digital television programs in the space of a single legacy analog channel (6 MHz for NTSC or 8 MHz for non-NTSC-based systems).

The distribution networks of MVPD systems, whether cable TV or satellite, are known as "managed networks" because the output of a multiplexer is typically of a fixed bit rate. For comparison, the Internet data network is known as an "unmanaged" network, since the public use of the Internet is not regulated by a central controlling mechanism and bandwidth between two points on the network varies unpredictably.

Variable bit rate (VBR) video encoding is more efficient in the use of bandwidth than CBR encoding. VBR also generally delivers a better quality picture for the same average bandwidth. However, VBR is more difficult to manage on a distribution network. Statistical multiplexing is used to address this difficulty.

With the advent of interactive services hosted in a central location, such as a cable TV headend as well as with media originating "in the cloud" and routing over a managed network to a consumer set-top box, the difficulty of managing the VBR session within a multiplexer becomes far more challenging and more prone to adverse interactions among the sessions within a multiplex stream.

Interactive television services provide the viewer with the ability to interact with their television for the purposes of selecting certain television programming, requesting more information about the programming, or responding to offers, among many possible uses. Such services have been used, for example, to provide navigable menu and ordering systems that are used to implement electronic program guides and on-demand and pay-per-view program reservations without the need to call a service provider. These services typically employ an application that is executed on a server located remotely from the viewer. Such servers may be, for example, located at a cable television headend. The output of a software application running on such servers is streamed to the viewer, typically in the form of an audio-visual MPEG Transport Stream. This enables the stream to be displayed on (or using) virtually any client device that has MPEG decoding capabilities, including a "smart" television, television set-top box, game console, and various network-connected consumer electronics devices and mobile devices. The client device enables the user to interact with the remote application by capturing keystrokes and passing these to the software application over a network connection.

An interactive television service combines the properties of managed and unmanaged network topologies. Such services require low delay, perceptually real-time properties typically associated with Real Time Transport Protocol running over User Datagram Protocol (UDP/RTP) high-complexity, proprietary clients. However, in interactive television applications the stream must be received by relatively low-complexity clients using consumer electronics-grade components. Typically, these clients do not have the capability of much more powerful laptop and tablet computers to which the user has grown accustom. Hence, interactive applications hosted on a cable or satellite set-top box are perceived as slow and old-fashioned compared to the contemporary norm. Hosting the application in a central means (e.g., a remote server located at a cable television headend) and providing the picture output to the set-top device mitigates this shortcoming and allow for the delivery of rich, highly interactive applications and services. It also places stronger demands on the distribution network to deliver these services.

A centrally (remotely) hosted interactive television service provides a combination of relatively static image portions representing a Graphical User Interface (graphical UI or GUI) that requires low-latency, artifact-free updates responsive to user input, and other portions that may have video with associated audio that require smooth and uninterrupted play-out. Conventional network distribution systems do not adequately facilitate this combination of data types. For instance, with existing statistical multiplexers for cable or satellite television systems, when large user interface graphics of a particular session need to be sent to a particular client, the many other sessions sharing the same multiplex have no means available (except a drastic reduction in image quality) to scale back the bandwidth requirements of adjacent streams to allow a temporary large data block representing the UI graphics to pass.

With many interactive sessions active within a single multiplex stream, a possibility exists for disruption to video, audio and/or GUI data. The only alternative that conventional systems have is for the conservative allocation of bandwidth which then supports many fewer simultaneous sessions per multiplex stream.

Therefore, it is desirable to provide an improved way for multiplexing interactive program streams.

Additional background information is provided in U.S. patent application Ser. Nos. 12/443,571; 13/438,617; and 14/217,108, all of which are incorporated by reference herein in their entirety.

SUMMARY

Digital television over a managed network such as a cable television system uses constant-bandwidth channels to carry multiple program streams. Multiplexing within a fixed allocation of bandwidth requires a multiplexer controller to manage the allocation of bandwidth among a group of competing program streams or competing sessions. In this manner, an individual program stream or session competes for bandwidth against the remainder of the program streams in the group of program streams. Control logic in the multiplexer controller is used to manage the byte allocation among the program streams so that as few compromises as possible in quality are required, and the necessary compromises are evenly distributed among the group.

On an unmanaged network, such as the Internet, a single program stream (or session) competes for bandwidth with a large number of other unknown streams over which the multiplexer's controller has no control. One of the many advantages of the systems and methods described herein is that a multiplexer controller can control both managed and unmanaged network traffic and utilize a class-based, multi-dimensional control logic that optimizes the interactive user experience for television programming distributed across any type of network.

In some embodiments, a method for prioritizing content classes in multiplexed content streams is performed at a server system. The method includes assigning a group of user sessions to a single modulator. The user sessions include data in a plurality of classes, each class having a respective priority. An aggregate bandwidth of the group of user sessions for a first frame time is computed. It is determined that the aggregate bandwidth for the first frame time exceeds a specified budget for the modulator. In response to determining that the aggregate bandwidth for the first frame time exceeds the specified budget, bandwidth is allocated for the group of user sessions during the first frame time in accordance with the class priorities. Using the modulator, the group of user sessions is multiplexed onto a channel corresponding to the modulator, in accordance with the allocated bandwidth. The multiplexed group of user sessions is transmitted over a managed network.

In some embodiments, a server system includes a plurality of modulators to multiplex respective groups of user sessions onto respective channels for transmission over a managed network, in accordance with allocated bandwidth. The server system also includes one or more processors and memory storing one or more programs configured to be executed by the one or more processors. The one or more programs include instructions for performing the above-described method.

In some embodiments, a non-transitory computer-readable storage medium stores one or more programs configured for execution by one or more processors of a server system that also includes a plurality of modulators to multiplex respective groups of user sessions onto respective channels for transmission over a managed network in accordance with allocated bandwidth. The one or more programs include instructions for performing the above-described method.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

FIG. 2 illustrates a vertical allocation strategy of assigning user sessions to a particular quadrature amplitude modulation (QAM) modulator until it is full, then allocating sessions to the next modulator with the goal of fully loading one modulator before allocating sessions to another, in accordance with some embodiments. This allocation strategy is also known as modulator (or QAM) affinity and is beneficial where high volumes of interactive television signals are multiplexed.

FIG. 3 illustrates a horizontal allocation strategy of evenly assigning user sessions among all available QAM modulators. This allocation strategy is beneficial for multiplexing mostly linear television programming.

DETAILED DESCRIPTION

Figure 1:
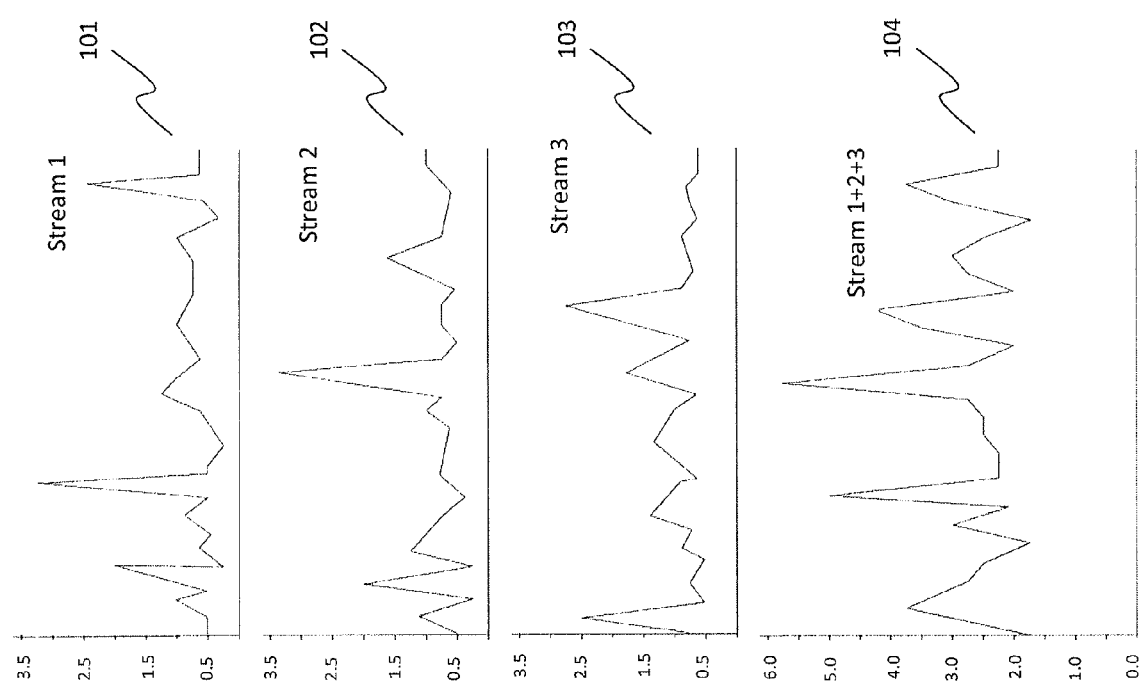
FIG. 1 illustrates a distribution of bandwidth peaks within multiple VBR streams over time and a resulting aggregated bandwidth for a group of signals corresponding to the combined streams, with peaks at typical intervals illustrating the random dispersal of peaks within the group of signals.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The legacy analog television channels of 6 MHz (8 MHz for non-U.S.-based systems) are now largely filled with digital carriers containing many digital TV channels each. More recent cable television distribution networks were designed for broadcast TV, and not interactive television. Hence, there are many obstacles for providing interactive experiences using such legacy distribution networks.

In order to take maximum advantage of the digital bandwidth on a managed network, digital encoding is employed that utilizes a variable-bit-rate (VBR) method to efficiently accommodate differences in video content. For example, a video program might have a prolonged scene with little action and hence have a comparatively low bit rate. When in this same program an action scene arrives, the bit rate will usually increase substantially. VBR encoding can generally follow the action, so to speak, and adjust the resulting bit rate in essentially direct proportion to the demands of the program or service producing the audio-video information: low bit rate for still scenes, slightly more for talking heads and a high bit rate for action. In contrast, conventional systems typically can only employ a Constant Bit Rate (CBR) encoding regime. Hence, the bit rate would have to be high enough to accommodate the maximum requirement of the action scene even though the average bit rate might be less than one-third of the action scene's peak bit rate. Unlike CBR encoding, it is this very difference between peak and average bit rate that can be exploited when employing VBR encoding to maximize the number of television programs that can be combined into a single multiplexed stream.

"Statistical multiplexing" effectively aggregates multiple VBR streams to smooth-out transmission peaks. The peak utilization of the aggregated stream is less than the sum of the peak utilization of the individual streams. In other words, the streams share a certain amount of headroom. "Headroom" represents a bits-per-second amount (e.g., eight megabits-per-second (Mbps)) that is set aside for one or more streams of audio-video-data. As the system employs VBR encoding, a stream that may average 2 Mbps will peak occasionally to perhaps 6 Mbps. So if there is a multiplex of, for example, ten streams, one of the ten may peak at any given time. If it is expected that two of ten might peak simultaneously at any given instant, one allots 8 Mbps to allow the two streams to overshoot by 4 Mbps each. As more streams are multiplexing into a group, less collective overhead is needed because each stream will also drop below the 2 Mbps momentarily and the collective under-utilized bandwidth can contribute to the headroom reserve.

The term "statistical" comes from combining (i.e., multiplexing) digital video streams with the expectation that, on average, not all streams will require maximum headroom at the same time. In fact, MVPD operators specifically group their channels by program type so that not all sports channels are in one multiplex, and the like. Hence, if one can disperse bursty traffic, such as MPEG where scene changes and intra-encoded frames (I-frames) are much larger than the average bit rate of the stream, among the less active program channels, statistical multiplexing can provide a significant gain.

There is a probability, although small, that too many individual streams within a multiplex group experience a peak at the same time. FIG. 1 illustrates a distribution of peaks within multiple VBR streams over time. The bit rates of three example streams 101, 102, and 103 are shown with each having a peak bit rate of approximately 3.5 Mbps. Without statistical multiplexing, 3×3.5=10.5 Mbps would be required for the multiplex group. The fourth stream 104, which corresponds to the multiplex group, shows the aggregated bandwidth of the three individual streams, with a peak bit rate of 6.0 Mbps. Thus, the multiplexing gain is 4.5 Mbps (i.e., 10.5 Mbps-6.0 Mbps). This savings can be used either for better quality for all streams, or for serving more streams in the same amount of bandwidth.

"Intelligent multiplexing" (i-muxing) adds a variety of mitigation techniques to statistical multiplexing when too many peaks would otherwise collide, i.e. when the bandwidth allocated to the aggregate of the streams would be exceeded. For example, screen updates to the user interface for interactive television applications can be deferred to a later frame. This reduces the aggregated bandwidth, but at the cost of increasing the delay before the user sees an expected update to an on-screen menu, for example. This delay is known as latency. In another example, if the screen update for the user interface provides the most information (e.g., the user is expecting a menu to appear), a multiplexer controller with knowledge of this event sequence can decide to not delay the UI screen update and rather drop video frames, which the user may be less likely to notice. Other embodiments vary the picture quality to reduce bandwidth utilization when required by varying the quality of video from external sources, where the quality is reduced by changing encoding parameters in the encoding/transcoding process.

In order to fully exploit these bandwidth allocation means, a class-based prioritization scheme is used. The class basis is established by giving priority to various components of information sent to the client. In some embodiments, the classes are as below; listed in order of priority, from highest priority to lowest priority:

1. Transport Control Information (for example, the MPEG Transport Stream), as this component carries the critical access control and timing information;
2. Audio, as humans notice and react badly to interrupted audio much more than to glitches in video, possibly because our ears do not blink the way our eyes do;

3. Video, such that video frames are dropped to open room for more critical data rather than reduce picture quality, in a process that is often unnoticeable;
4. User interface elements, as the graphical elements of a user interface can be delayed to avoid too many video frames being dropped, thus adding latency to the interface which is rarely noticed; and
5. Error correction information used to "repaint" parts of the video image to mitigate error build-up, which is lowest in priority since its contribution to the user experience is subtle and often subliminal.

In some embodiments, the system provides a "holistic" approach to mitigating problems in one layer (e.g., a layer of the OSI model) by changing behavior of another layer. For example, if the system (e.g., a server located at a cable television headend) detects bandwidth constraints on the data link layer, it mitigates this by manipulating packets on the transport layer by changing transmission timing or by modifying the on-screen presentation by postponing UI updates or reducing frame rates. The system can do this because the system spans almost all layers.

In some embodiments, the system is also aware of the actual program type and can dynamically alter the priorities described above, possibly even reversing them. For example, video frames may be dropped to give user-interface elements priority to pass based on the knowledge that in this particular content, the user is expecting the UI graphics to appear and will not notice the dropped video frames (e.g., because the video is in a reduced size and not the focus of the user's attention). The priorities of video and user-interface elements thus may be reversed.

These three bandwidth mitigation techniques, combined with a flexible, class-based prioritization scheme, provide the ability to optimally control a digital-media multiplexing system.

The systems and methods described herein address (i) low session count on QAM (i.e., on a QAM channel), (ii) unused bandwidth, (iii) latency and non-smooth animations. Other problems addressed are if requested bandwidth temporarily exceeds available bandwidth, deferring bits could cause unpleasant user experiences, particularly connection loss, audio dropouts, and loss of video synchronization or uneven playback speed. By prioritizing these classes of bits, continuity can be guaranteed at the expense of only occasional increase in UI latency.

In addition, some embodiments described herein provide the following functionality:
 Allocating multiple sessions on one compositor on the Session Resource Manager (SRM) on one QAM (i.e., on one QAM channel), with static bandwidth allocations on the resource manager, and dynamically shifting bandwidth between sessions;
 Class-based bit budget allocation (audio/control, video, UI, intra-refresh); and/or
 Latency optimized scheduling of UI updates.

This flexible and dynamic bandwidth allocation allows for combining (multiplexing) streams that have variable bit rate requirements with a high peak-to-average ratio. Traditionally on a cable network, a CBR session is allocated on a QAM to guarantee sufficient quality of service. The bandwidth allocated is either set high, resulting in a large amount of unused bandwidth, or set low, resulting in higher latency and a non-smooth user experience. Other advantages of this flexible and dynamic bandwidth allocation include increased session count on QAM transport streams; less unused bandwidth, better (lower) latency, better animation smoothness, and the ability to trade off some quality for even higher session count.

In intelligent multiplexing (i-muxing), multiple user sessions share a set amount of bandwidth available to the i-mux group. The allocation occurs per frame time (e.g., 33 msec or 40 msec). If, during a frame time, the total sum of requested bandwidth for all sessions exceeds the available bandwidth of the i-mux group, the bit budget is allocated among the sessions and certain bits are deferred. Different classes of bits are allocated according to different priorities in the following order: (i) basic transport stream control and audio, (ii) video or partial-screen video, (iii) UI updates, and (iv) intra-refresh of video frames. (This list corresponds to the above list of five priority classes, except that bits for basic transport stream control and for audio are combined into a single highest-priority class.) The prioritizing of bits takes place while still generating a compliant MPEG transport stream for each session. Accordingly, the systems and methods described herein categorize bits into different classes, provide class-based allocation and, in case of delayed bits, create "filler slices" to maintain MPEG compliancy and provide feedback to the user-interface rendering engine to defer UI updates if necessary.

The following sections will explain how class-based, intelligent multiplexing is performed in cable television systems that use Switched Digital Video, Video-On-Demand (VOD), or interactive television services and simultaneously optimizes video quality and minimizes response time of interactive service over the same managed network of the cable plant while maintaining a standards-compliant transport stream suitable for decoding by the cable TV set-tops (e.g., set-top boxes) connected to the system.

FIGS. 5-9 are time-flow diagrams of class-based allocations for various scenarios. Each diagram depicts two sessions, a full-screen audio-video session ("session a") and a mixed user-interface and partial-screen audio-and-video session ("session b"), and their allotted allocations for CBR audio A, VBR video V, and VBR UI (User Interface) packets, during frame times t (i.e., t+0) to t+4. Each block in the time-flow diagram is labeled according to its allocation for a specific class, session and frame. For example, $UI_{b/0}$ identifies the allotted share of bandwidth for user-interface packets of session b, frame 0. The depicted blocks merely indicate a share of the total available bandwidth at frame time t+n. The blocks may include one or more transport stream (TS) packets and the scheduling of the packets within a frame time may be subject to other considerations than the class-based i-muxing allocation scheme explained herein. Also, a typical QAM modulator has more capacity than just for two sessions.

Throughout the scenarios depicted in FIGS. 5-9, the allocations for session a's audio and video elements are kept the same. Although all sessions within an i-mux group may be subject to class-based allocation policies, for clarity of the discussion the allocations in these examples only affect session b. Furthermore, the sessions' CBR audio is never part of the tradeoff. As noted earlier, the human brain is far more sensitive to audio glitches than it is to minor video latency, frame rate or quality degradation. (As it's known: the ears don't blink.)

Figure 5:
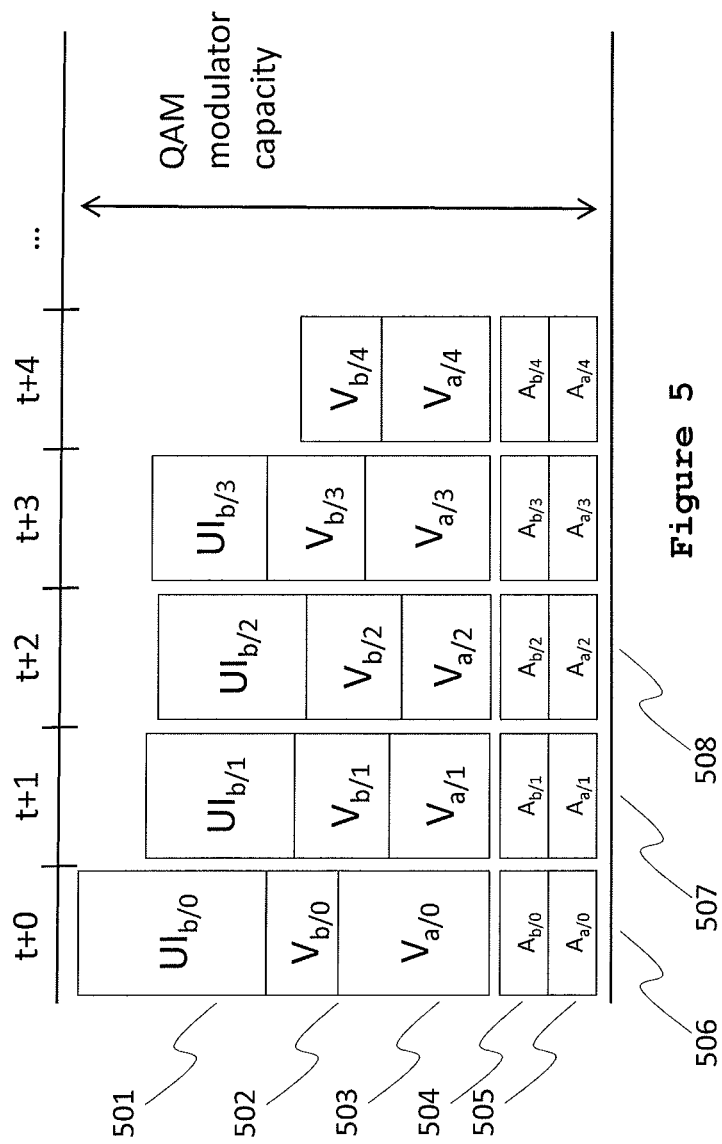
FIG. 5 is a time-flow diagram of class-based allocation, illustrating packet distribution where UI elements, video and audio elements of two sessions have adequate bandwidth within a QAM modulator.

A time-flow diagram of class-based allocation is shown in FIG. 5 where the allotted shares of audio, video and user-interface bandwidth for each frame fit the QAM modulator's capacity (i.e., the maximum bandwidth). The aggregate 506 of session a's audio share 505 and video share 503 and session b's audio share 504, video share 502 and user-interface share 501 for the frame at t+0 fits the QAM modulator's capacity available for the frame at t+0, as do the aggregates 507 and 508 for the capacity available at t+1 and t+2. ("Share" in this context refers to a share of the data in an i-mux group at a given frame time.)

Figure 6:
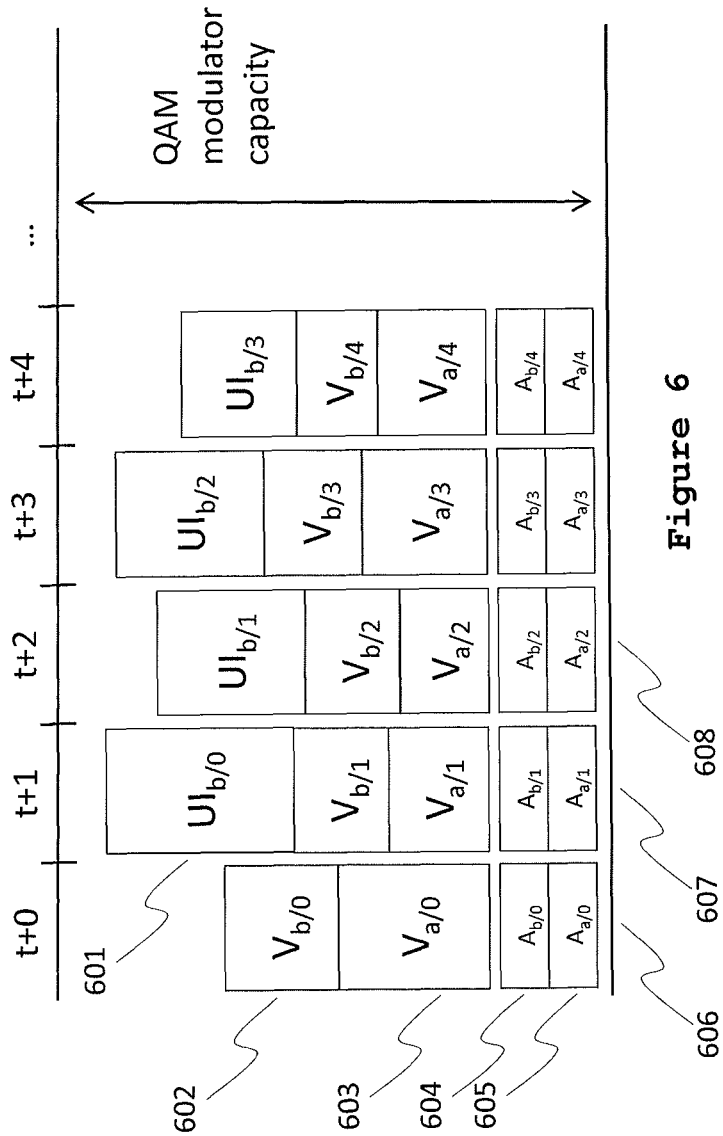
FIG. 6 is a time-flow diagram of class-based allocation where one-frame latency is introduced for the UI elements of session b to accommodate full frames for video elements and UI elements of both session a and session b.

For comparison, FIG. 6 is a time-flow diagram of a class-based allocation where the data for session b's user-interface elements, starting with 601, are delayed by one frame time (i.e., from t to t+1 for $UI_{b/0}$, from t+1 to t+2 for $UI_{b/1}$, from t+2 to t+3 for $UI_{b/2}$, and from t+2 to t+3 for $UI_{b/3}$) to accommodate for session b's larger share of data from its video elements. This delay is implemented in response to the fact that the aggregate 606 for frame 0 would exceed the QAM modulator capacity if $UI_{b/0}$ were included. Although the introduction of latency (in this example, a latency of one frame time) for the user interface may not generally be beneficial from an interactivity perspective, the skilled person may understand that it is by far the easiest to delay frames from the user interface. Moreover, not all data from the user-interface class may be the result of interactivity. Unsolicited updates (e.g., cover art, spinners or commercial banners) may occasionally animate. For such updates it is perfectly acceptable to give the data from the session's video elements preference over the session's user-interface elements.

Figure 7:
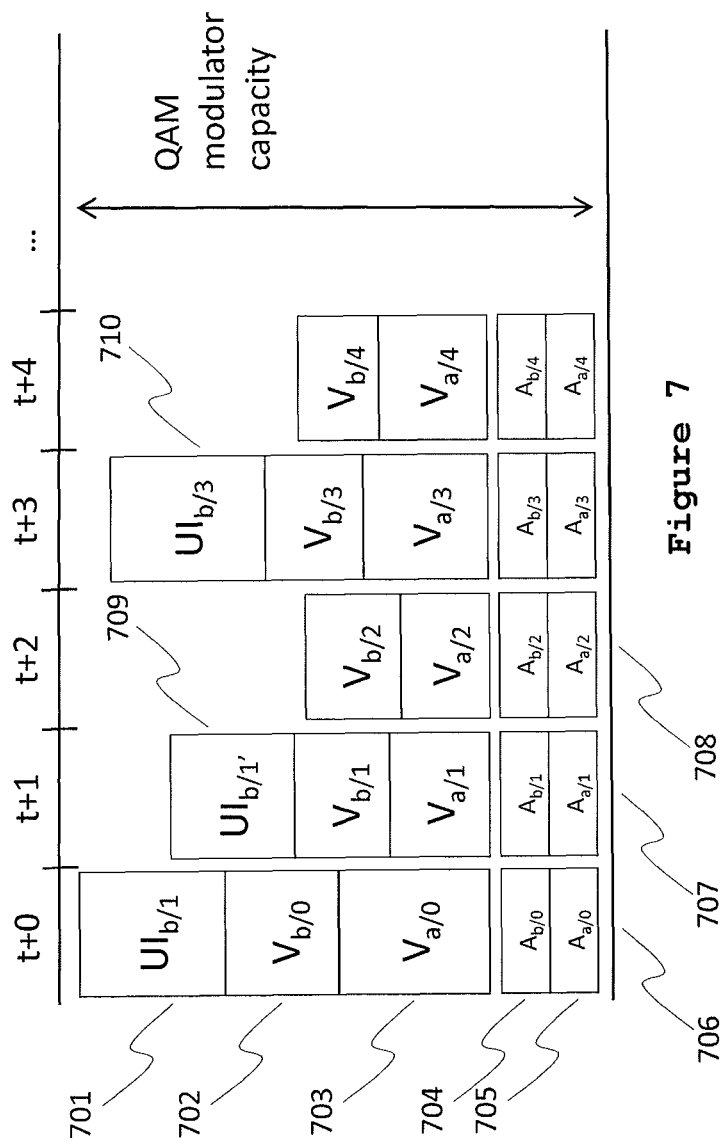
FIG. 7 is a time-flow diagram of an alternative class-based allocation scheme where session b's video elements are given precedence over session b's UI elements, by selectively dropping and rescheduling UI frames to make room for full-frame-rate video elements.

Conversely, FIG. 7 provides a time-flow diagram of an alternative class-based allocation scheme where instead of delaying the user-interface data of frame 0 to t+1, the frame rate for user-interface data is reduced. The user-interface data for frame 1 is rescheduled to be partially sent at t+0 (701) and the remainder at t+1 (709). Although user-interface data for frame 0 and frame 2 are dropped, the remaining elements are at their intended positions, thus masking the latency and possibly achieving intended synchronization of the user-interface elements with the video elements. Dropping frames for user-interface elements is particularly efficient since user-interface elements typically produce bursty data, easily exceeding the session's average bit rate. Reducing the frame rate by the factor the data exceeds the average is an effective method to keep the data within the allotted share without the introduction of latency, especially if the updates are part of an animation.

Figure 8:
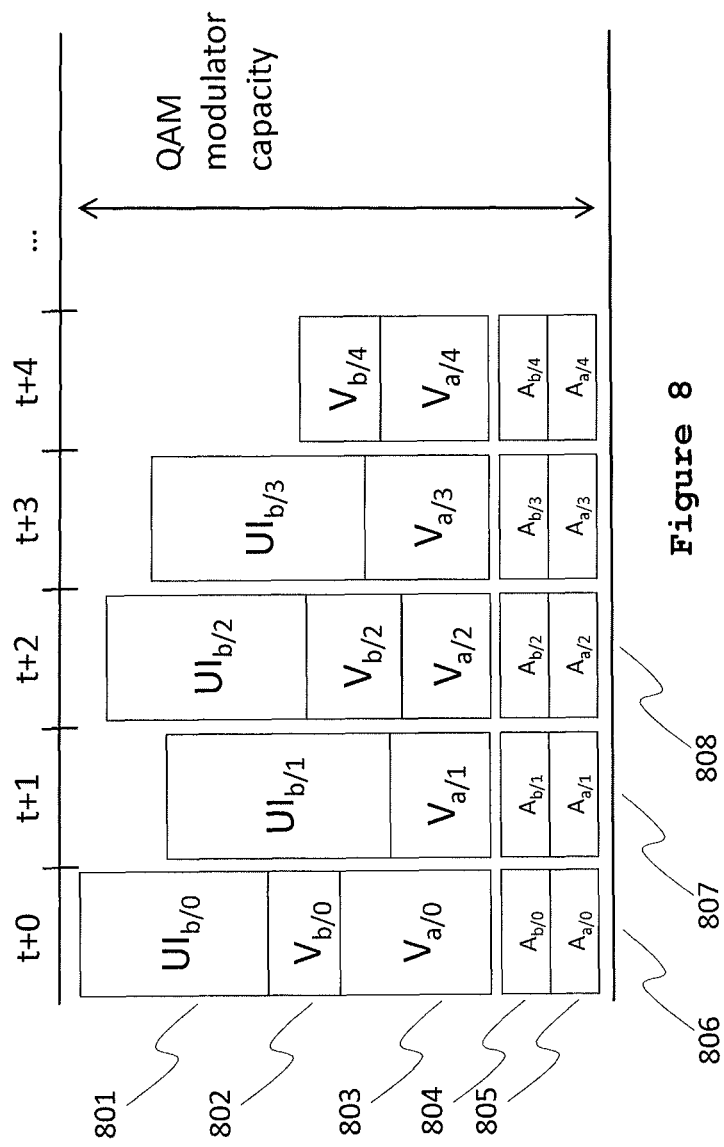
FIG. 8 is a time-flow diagram of an alternative class-based allocation scheme where session b's UI elements are given precedence over session b's video elements, by selectively dropping video frames to make room for UI elements.

FIG. 8 provides a time-flow diagram of an alternative class-based allocation scheme where instead of reducing the frame rate for user-interface elements of session b, frames (and corresponding packets) from the video elements are dropped. When comparing aggregate 807 to aggregate 507, it can be seen that $V_{b/1}$ (i.e., session-b video data for frame 1) is dropped at t+1 to accommodate the larger $UI_{b/1}$ (i.e., the session-b user-interface data for frame 1). If the user-interface elements update because of input from the user, it may be assumed that the focus of the user is on the animating (i.e., updating) user-interface elements. Hence, the user may not notice a reduced frame rate of the video elements and frames from these elements may be dropped to accommodate the data from session b's user-interface elements.

Figure 9:
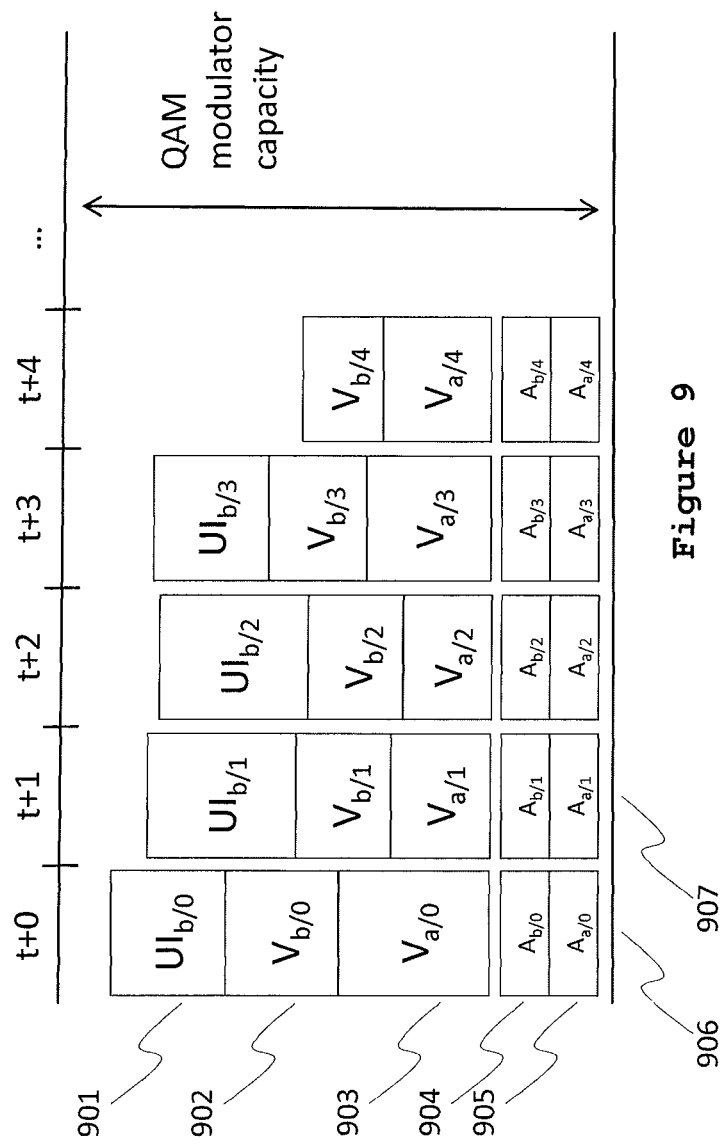
FIG. 9 is a time-flow diagram of an alternative class-based allocation scheme where the quality of session b's UI elements is reduced to make room for session b's full-frame-rate video elements, while keeping the UI elements also at full frame rate.

Finally, FIG. 9 provides a time-flow diagram of an alternative class-based allocation scheme where no frames are dropped, but the size of the user-interface elements data 901 for frame 0 (i.e., $UI_{b/0}$) is reduced compared to 501 by reducing the quality of the update, for example through a higher quantization, to accommodate the larger share of video data 902 compared to 502. Such a reduction may be particularly suited for updates that are part of a series of updates or animation, but may be less suited for updates that will remain on the screen for a longer time, such as for example the last frame of an animation or the end state of an updated user-interface element.

Figure 10:
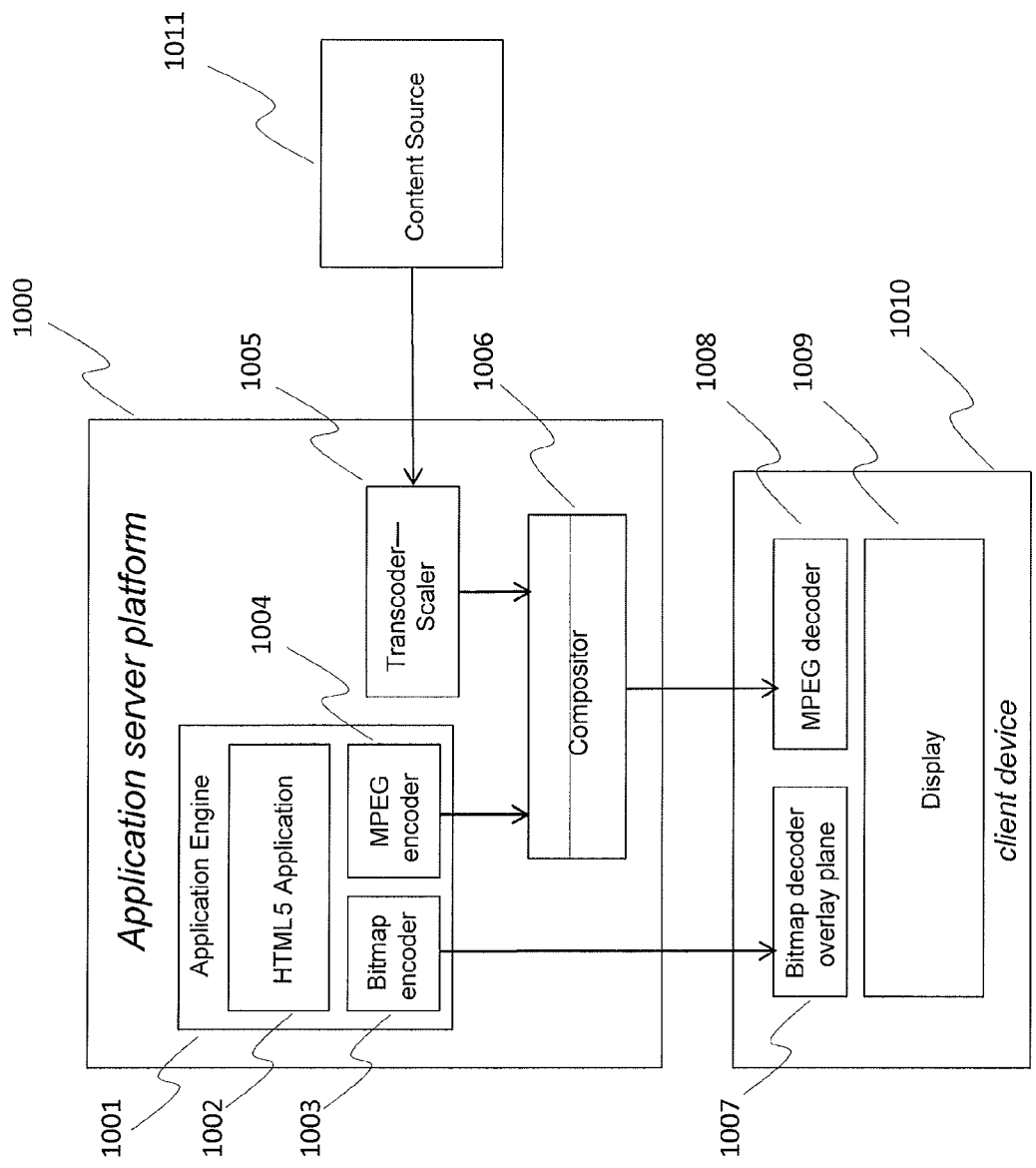
FIG. 10 is a schematic of an application server platform and client device according to some embodiments of a cloud-based application server system that generates the various audio, video and graphical elements to be multiplexed and sent to the client device.

To help illustrate the interaction between the elements of the server and relationship between the server elements and the client device without regard to specific elements of the communications network (i.e., of the distribution network), FIG. 10 provides a block diagram overview. An application server platform 1000 (also referred to as an application server or remote application server), which is an example of the server system in the allocation examples of FIGS. 5-9, includes two or more sources that generate audio-visual information to be conveyed to a client device 1010 of a specific consumer at a remote location. One source of audio-visual information is the application engine 1001, which hosts (executes) a software application on an HTML5 application processor 1002, which itself is but one possible processor of many known to those skilled in the art. The consumer interacts with the application engine 1001 via a network, which could be a cable television network or the Internet. The application engine 1001 creates at least two types of visual information. One type of visual information is graphical bitmaps, such as on-screen menus or other static information displays. The bitmaps are encoded by a bitmap encoder 1003. In this example, the bitmap output of 1003 is transmitted through the network to a client device 1010 that is capable of rendering graphic overlays on command from the application server platform 1000. Otherwise, for client devices not capable of locally rendering graphic overlays, the bitmap outputs are first rendered to MPEG and then combined in the compositor 1006 prior to transmission to client device as a completed video frame.

Another source of audio-visual information that produces output in response to the consumer interaction at the client device 1010 with the remote application server 1000 is by MPEG encoder 1004, which encodes or re-encodes full-motion video from a plurality of sources such as Internet videos (e.g., from a service such as YouTube) or video servers associated with the cable television system that hosts the application server 1000. Yet another source of full-motion video comes from content source 1011 that might come from an Internet-based video service or website featuring video clips (e.g., YouTube) or other service (e.g., Netflix) which provides long-form content such as feature films.

Most Internet video sources do not produce video streams that are in an encoded-video format compatible with cable television digital set-top boxes, and, therefore, the server system may transcode the video from the native format of the content source 1011 to MPEG-compatible format compatible with the client device 1010. An additional benefit of the application server platform 1000 is the ability to mix video and graphics information in many combinations of overlays as well as picture-in-picture windows, among many other options. This combination of resources can be programmatically determined by the application engine 1001, which outputs a single MPEG stream representing the composite audio-video information that is streamed to the client device 1010. In other embodiments, full-motion, full screen video from either MPEG encoder 1004 or content source 1011 is sent to the Client 1010, and user-interface controls (e.g., digital video recorder (DVR) controls to play, stop, fast-forward, etc.) are sent to client 1010 by the bitmap encoder 1003 to be rendered by bitmap decoder 1007 and displayed as an overlay of the full-screen video as rendered by MPEG decoder 1008.

The client (e.g., client device 1010) and the server (e.g., application server platform 1000) are, in cable television systems, separated by a managed digital network that uses well-known digital video transport protocols such as the Society of Cable Telecommunications Engineers' Service Multiplex and Transport Subsystem Standard for Cable Television (SMTS) for United Stated cable TV or DVB-C for most international cable systems. In this instance, 'managed' means that bandwidth resources for providing these services may be reserved prior to use. Once resources are allocated, the bandwidth is generally guaranteed to be available, and the viewer is assured of receiving a high-quality interactive television viewing experience. When configured properly, class-based intelligent multiplexing provides consistent delivery such that the user generally cannot tell that the interactive television application is being executed on a remote server and is not, in fact, executing in the set-top box, smart TV or whatever client device is displaying the resulting audio-video information.

Figure 12:
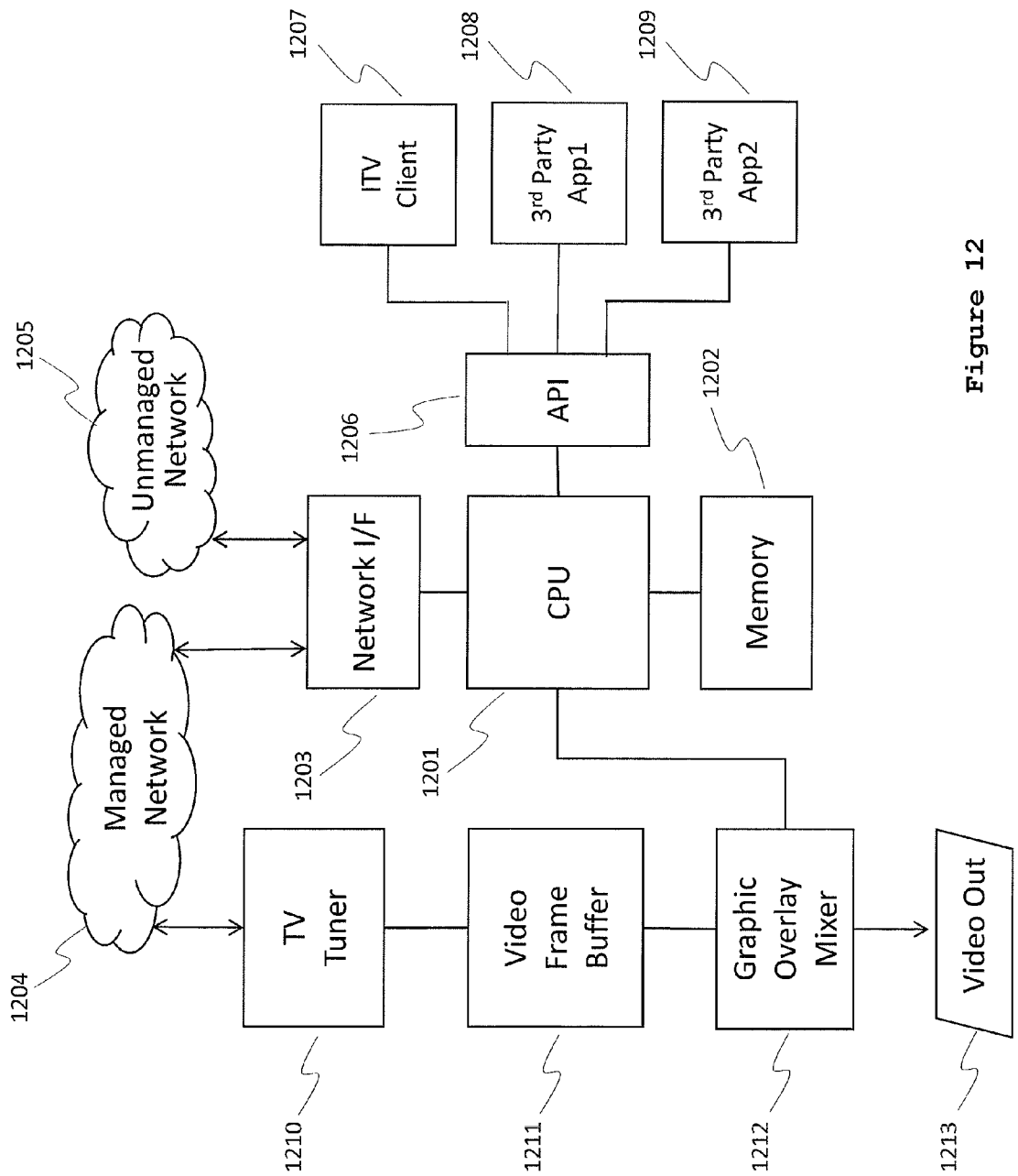
FIG. 12 is a schematic of a client device (e.g., a set-top box or smart TV host system) running an ITV client application and third-party applications.

FIG. 12 is a schematic according to some embodiments of a client device (e.g., a set-top box or smart TV host system) running a dedicated ITV client application 1207 and third-party applications 1208 and 1209. A tuner 1210 feeds the signal from a particular program and channel to a video frame buffer 1211. A graphic overlay mixer 1212 adds certain locally generated graphics and combines them with the video signal from the video frame buffer 1211, in accordance with information supplied to central processing unit (CPU) 1201. CPU 1201 draws on inputs from the managed cable system network 1204, an unmanaged network (e.g., the Internet) 1205, various third-party applications 1208 and 1209, and the dedicated ITV client application 1207. A network interface 1203 provides inputs from the managed cable system network 1204 and unmanaged network 1205 to the CPU 1201. An application programming interface (API) 1206 serves as an interface between the CPU 1201 on one side and the various third-party applications 1208 and 1209 and dedicated ITV client application 1207 on the other side. The graphic overlay mixer 1212 generates a video output ("video out") signal that is sent to a display.

The systems and methods for intelligent multiplexing described herein allow high-quality interactive television applications to be offered to client devices, and thus to the consumer, from a central location (e.g., the cable television headend) in place of interactive applications that run on the client device (e.g., in the consumer's home). Intelligent multiplexing thus provides interactive television applications to consumers through client devices that are not running dedicated ITV client applications 1207.

Figure 11:
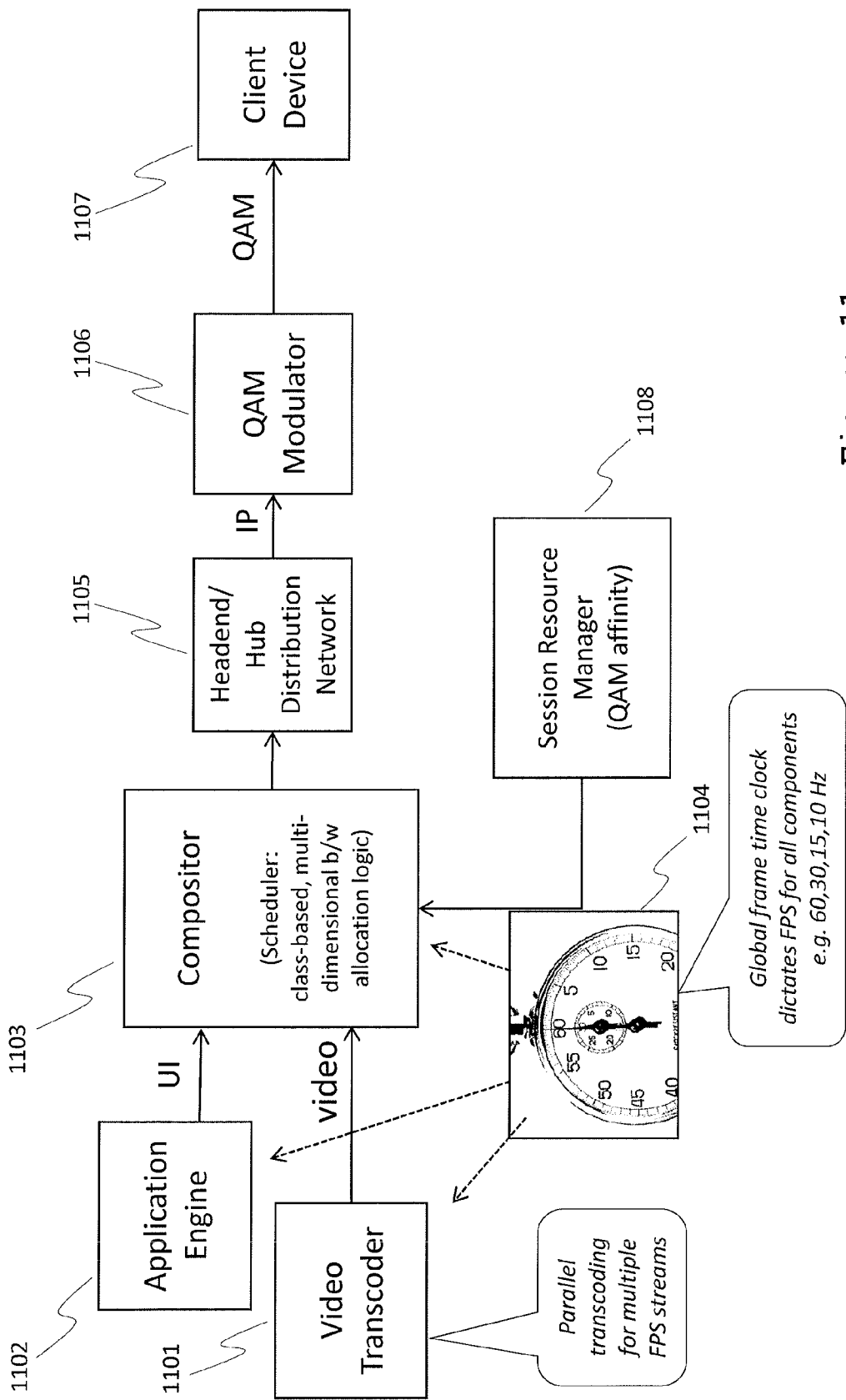
FIG. 11 is a schematic according to some embodiments of an interactive television (ITV) application server and client device depicting distribution-network elements.

FIG. 11 is a schematic of an ITV application server (e.g., the application server platform 1000, FIG. 10), a client device 1107 (e.g., client device 1010, FIG. 10), and distribution-network elements, in accordance with some embodiments. The application engine 1102 is the programmatic means by which the user interacts with the application server via the client device 1107 via bandwidth provided by the headend or hub distribution network 1105 utilizing QAM modulators 1106 (e.g., for a cable TV network). The session output (audio, video, and graphics) from the application engine 1102 and/or the video transcoder 1101 is sent downstream to the client device 1107 over the network.

The session resource manager 1108 advantageously assigns dedicated user sessions from the headend 1105 to client devices 1107 using the managed network of the cable television system.

The timing of compositor 1103 is controlled by means of a global frame-time clock 1104, which maintains a cadence that coordinates the combination of video, audio, and user-interface graphical elements such that as smooth as possible playback occurs on the client device 1107.

To perform statistical multiplexing, groups of streams that can share bandwidth are identified. (In this document, bandwidth means bits per second, not hertz). In existing cable television distribution systems employing switched digital video (SDV) and video-on-demand (VOD) services, multiple user sessions already share a common resource, which is the digital video Transport Stream (MPEG Transport) usually transmitted via a quadrature-amplitude modulated (QAM) carrier which is modulated into a six megahertz bandwidth slot (i.e., channel) in place of the older analog television signal of NTSC or an eight megahertz bandwidth slot (i.e., channel) in place of the older SECAM or PAL television signals. It is therefore logical to choose the Transport Stream on a QAM (or frequency-QAM pair) as the group within which class-based intelligent multiplexing ("i-muxing") is performed.

When allocating resources for a switched video session of any type, the digital information is routed to one or more specific QAM modulators 1106 serving the neighborhood that services the subscriber requesting the service. The resulting set of QAM-modulated transport streams may already carry allocations for other i-mux sessions. To have maximum benefit from intelligent multiplexing, multiple sessions should be allocated to a single QAM modulator until its bandwidth is fully allocated following the vertical allocation strategy, called QAM affinity, illustrated in FIG. 2.

Managing Groups of Interactive Television and VOD Sessions Utilizing QAM Affinity QAM affinity is a process by which each multiplex group is filled, as much as possible, before additional multiplex groups are utilized. QAM affinity is the converse of linear (or non-interactive) video services where QAM loading is spread out among available modulators as evenly as possible. In addition, all sessions in a statistical multiplexing group will be served by the same i-mux process. QAM affinity is performed instead of allowing sessions to be load-balanced in an arbitrary fashion: if an intelligent multiplexer (i-mux) is already muxing a stream onto a given QAM channel, then a next session on that same QAM channel should be allocated to the same i-mux so that bandwidth can be shared between the sessions and the merits of intelligent multiplexing can be enjoyed. Additionally, it is beneficial in some cases to group sessions on the same service area on the same i-mux such that the i-mux controller can allocate bandwidth across multiple mux channels into a single neighborhood.

Figure 13:
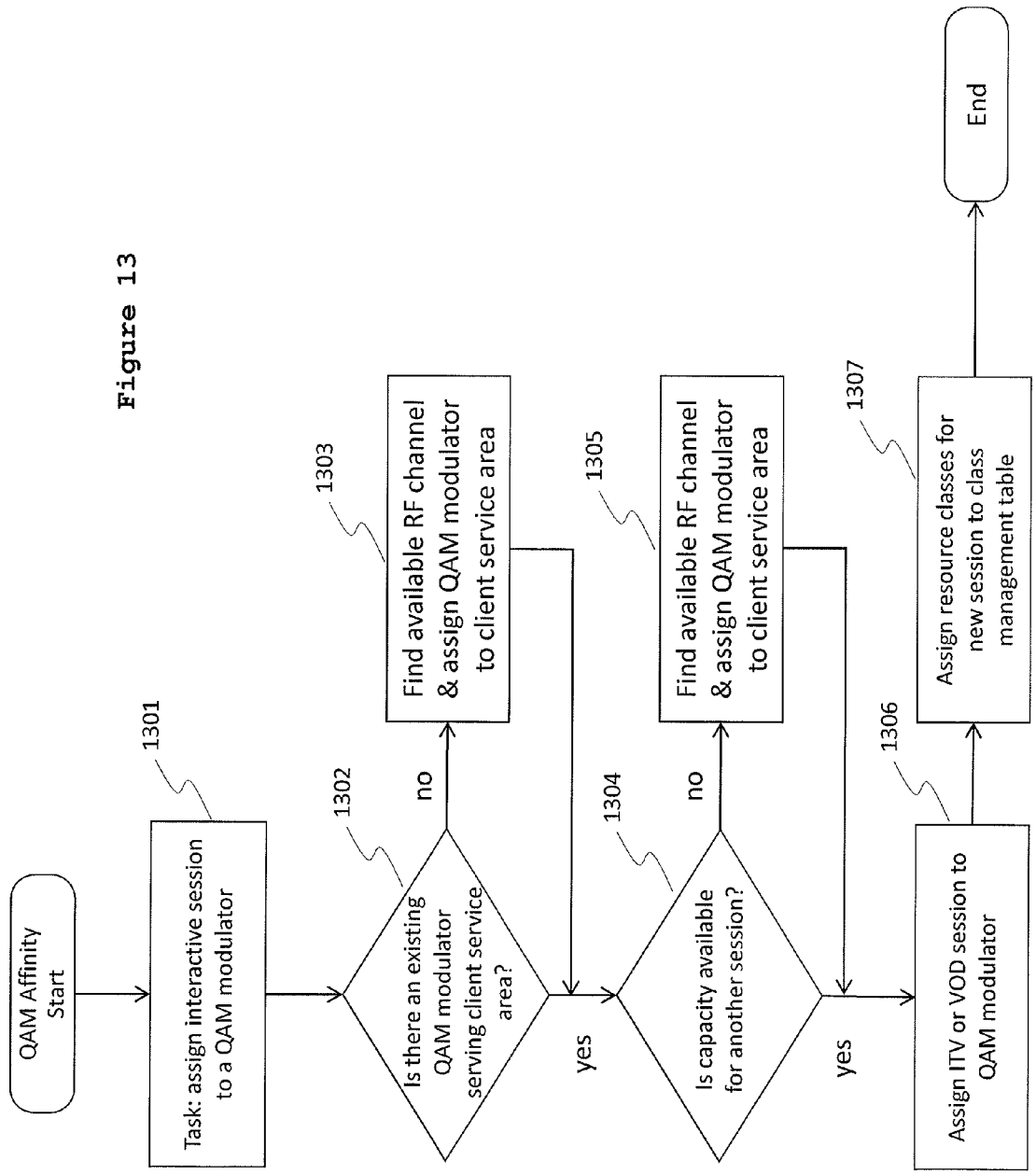
FIG. 13 is a flow chart depicting a method of assigning an interactive television or video-on-demand (VOD) session to a specific QAM modulator using the QAM affinity process in accordance with some embodiments. The interactive television session streams are managed as a group and by geographic region such that the sessions can be managed by class-based intelligent multiplexing as a group without impacting non-interactive content which cannot be managed.

FIG. 13 is a flow chart depicting a method of assigning an interactive television (ITV) or video-on-demand (VOD) session to a specific QAM modulator using the QAM affinity process in accordance with some embodiments. In the method, a task of assigning an interactive session to a QAM modulator is identified (1301). It is determined (1302) whether there is an existing QAM modulator serving the client service area (i.e., the service location of the client device). The service location of a client device (e.g., set-top box) is provided by the client device itself in some cable television systems, or it may be read from a central database maintained by the cable system. If there is no such QAM modulator (1302-no), an available RF channel is found (1303) and a corresponding QAM modulator is assigned (1303) to the client service area.

It is then determined (1304) whether there is capacity available on the existing (or newly assigned) QAM modulator for another session. If capacity is available (1304-Yes), then the ITV or VOD session is assigned (1306) to that QAM modulator. The determination 1304 and subsequent assignment 1306 keeps sessions for a particular service area grouped on the same QAM channel as much as possible. If capacity is not available (1304-No), then an available RF channel is found (1305) and a corresponding QAM modulator is assigned (1305) to the client service area. The ITV or VOD session is then assigned (1306) to the QAM modulator. Resource classes for the ITV or VOD session are assigned in a class management table (1307), and the method of FIG. 13 ends. The class management table is maintained by the compositor 1103 in accordance with some embodiments.

As defined above, there are two methods to allocate resources to a QAM-modulated channel: vertically (e.g., as in the method of FIG. 13) to fill up one QAM first before allocation to another and horizontally to allocate resources to QAM channels in a round-robin fashion to evenly distribute channel loading and to maximize redundancy.

FIG. 2 illustrates a situation where resources for eight sessions have been allocated using the vertical distribution approach with 201 (QAM 1) being filled first and 202 (QAM 2) being used for the next group of interactive sessions. FIG. 3 illustrates the horizontal approach with the first session being allocated to 301 (QAM 1) and the next session to 302 (QAM 2) and so on across all QAM channels.

A vertical allocation strategy results in more opportunity for statistical multiplexing using class-based allocation: in the horizontal-allocation strategy example each QAM channel has only two sessions. The drawback of vertical allocation is that QAM channels are not equally loaded, and should a fully loaded QAM channel develop a fault and cease operating, more sessions are affected than in the horizontal allocation case. For ordinary television broadcasts, a failed QAM channel impacts many end-users and an operator may choose to have redundant QAM modulators allocated via automatic failover; however, for unicast (one-to-one) interactive sessions, a failed QAM impacts far fewer end-users and redundancy is less important. The improved quality and efficiency benefits of vertical allocation outweigh the drawbacks of reduced redundancy.

In some embodiments, from a high-level view, intelligent multiplexing includes the following functions:
  A grouping function in the i-mux that manages bit allocations for each session in the group of sessions as a whole;
  A load-balancing and resource-management function that selects an i-mux to serve a session based on QAM affinity, determined by the location of the service area of the session.
  A vertical allocation function.

The compositor, via communications with a session resource manager, creates and manages groups. In some embodiments, the compositor has the following capabilities:
  Define (add) a group, where the group receives an identifier and an aggregated bandwidth (in bits per second);
  Modify the bandwidth for a certain group; and/or
  Delete a group and close the session.

Furthermore, when configuring a session, an optional group identifier can be passed to signal the application of intelligent multiplexing. If the group identifier is not present, intelligent multiplexing is not performed. The bit allocation of the compositor continues to respect the individual stream's bandwidth; when multiplexing the streams at the output of the compositor, the aggregated bandwidth allocated to the group of sessions (if present) is respected as well, Screen updates are delayed that do not fit in the session's bit budget or in the group bit budget, where an update gets a priority that increases with waiting time.

Alternative behaviors to mitigate bandwidth constraints could be to select a representation of the same content with fewer bits:
  For video content encoded with multiple bitrates, select a lower bit rate version.
  For UI content, select a representation of the same fragment with fewer bits, by applying greater video compression to the encoded fields.

Furthermore, the server system can configure the average bit rate (as opposed to 'base' amount) and add a headroom (or reserve) amount that decreases as the number of sessions grows. The more sessions there are, the better the i-mux is able to make use of the multiple channels' fungible bandwidth so the need for additional headroom gradually decreases. The advantage to this approach is that as the QAM channel is nearing full capacity, the headroom is almost zero, thus maximizing the QAM usage.

For the streaming GUI use case (i.e., a user application operating from a location remote from the user) the bandwidth requested for a session depends on the application that is executed. Furthermore, this bandwidth is requested in advance. Since multiple sessions share a part of the bandwidth, less bandwidth is reserved than the expected nominal application bandwidth. If for example the application has been designed for a maximum video stream density requiring 8 Mbps, then the system typically reserves only 2 Mbps or a "base amount". Therefore, 6 Mbps of additional bandwidth is considered "headroom" and needs to be reserved separately, to ensure that the necessary bandwidth is always available. Therefore, the following steps are typically taken:
  1. Reserve a headroom amount for a dummy session, that is, a session that will not output any data but helps with the establishment of other sessions by reserving a common overhead space to be shared by the other sessions.
  2. For each new (actual) session, the system reserves the base amount (e.g.—2 Mbps in the example above.)
  3. The dummy session will be associated with a unique address and port at the QAM modulator but no bits are actually sent. Hence, the associated program identifier (service ID) on the corresponding transport stream will carry no bits. Likewise, in some cases, the dummy session does not require a service ID to be associated to it. This is typically a scarce resource on a QAM (a small amount of predefined service IDs exist per Transport Stream). Therefore, preferably a service ID is not allocated for the dummy sessions (or dummy resource blocks).
  4. When the last session in a group has terminated, the dummy session can be also terminated.

Once the base amount and headroom are defined, the application stays within the base amount plus headroom to accommodate worst-case situations. (For some applications the base amount would fluctuate depending on number of video titles available.) This aspect is not different from the non-intelligent-muxing use case. However, what is different is that when more sessions are added to the group, the headroom is shared among more sessions and the probability of undesirable congestion due to insufficient aggregate bandwidth increases. So with intelligent multiplexing, if an interactive session is the only one, then the application may respond quickly. Correspondingly, when more sessions are added, the latency imposed on the interactive session may increase. If that occurs, then the base amount and headroom could be increased.

In a further refinement, the headroom for a multiplex channel can be allocated as a whole, or it can be allocated as blocks (e.g., of one Mbps) to allow headroom to be gradually reduced as described above, to allow different headroom sizes to be used as different application mixes are used on the same QAM channel; each application has its own characterization in terms of base & headroom, or average bit rate & max bit rate.

The i-mux bit rate allocation works on two time domains. The first is per-frame: it must stay within the group bandwidth, and will do this by delaying UI updates or dropping frames. The second time domain is a feedback loop that requests more bandwidth for a group, rejects new sessions, or refuses requests from applications to play video (and indicates to the application that video is being refused so that the application can display a user-friendly message). The second-time-domain feedback loop is an algorithm that uses inputs such as needed vs. obtained bandwidth, measurement of latency due to i-muxing (for example as a histogram), frame drop rate, and other metrics. These inputs lead allow the i-mux to automatically increase or decrease an i-mux group bandwidth. In the absence of such an algorithm, the application could indicate to the i-mux that it requires more bandwidth, which the i-mux will then request from the Session Resource Manager (SRM) 1108 of FIG. 11.

Figure 14:
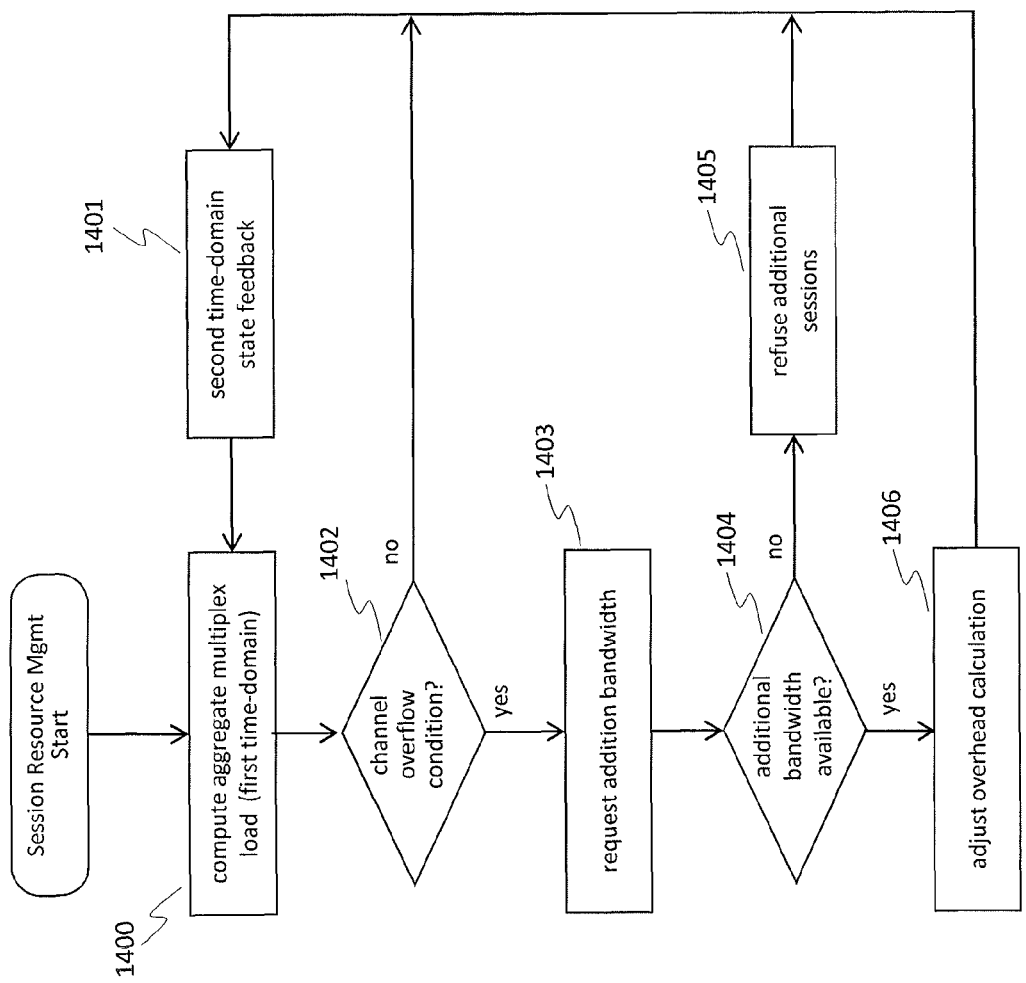
FIG. 14 is a flow chart depicting a process of managing a group of streams within a multiplex group in accordance with some embodiments.

FIG. 14 is a flow chart depicting a process of managing a group of streams within a multiplex group in accordance with some embodiments. FIG. 14 represents the top layer (i.e., level) of a multi-layer process of intelligent multiplexing. Element 1400 represents the process depicted in FIG. 15 while FIG. 15, in turn, includes an element 1506 detailed in FIG. 16.

An aggregate multiplexed load for the first time domain is computed (1400), The aggregate multiplexed load is compared to the available channel bandwidth to determine (1402) whether an overflow condition has occurred. If an overflow condition has not occurred (1402-No), feedback of state information is performed for the second time domain and the computation 1400 is repeated. If an overflow condition has occurred (1402-Yes), the server system requests (1403) additional bandwidth from the cable system for a potentially over-subscribed multiplex stream. If additional bandwidth is available (1404-Yes), the overhead calculation is adjusted (1406) to account for the additional bandwidth, and execution of the method transitions to element 1401. If additional bandwidth is not available (1404-no), additional sessions are refused (1405), such that no additional sections can be added to the i-mux group. In some embodiments, existing session are informed that bit sacrifices to one or more sessions will be necessary (e.g., are instructed to sacrifice bits), in response to the lack of availability of additional bandwidth (1404-no).

Class-Based Allocation

The transport stream bits cannot be delayed or dropped as the transport information provides the necessary support information, such as access control and critical timing signals among many other duties. Hence, it is assumed that the transport stream is provided with the bandwidth required.

Similarly, audio should not be interrupted as humans react poorly to disrupted audio, much more so than disrupted video. Hence, several strategies are employed to maintain smooth audio flow. In general, audio gets priority over video but should the need arise, audio can be sent ahead in blocks to an audio buffer of the client device and played out from the client audio buffer in timestamp-directed coordination with its respective video stream. Unlike conventional systems, the system described herein sends audio ahead to make room for oversize graphical elements of a user interface.

Video has the third priority, with the understanding that excessive compression of video is generally undesirable. Video bit-rate is generally reduced by conventional systems by raising the quantization level of the compression means (of, e.g. MPEG2 or H.264/5). The invention seeks to avoid the visual degradation of the system and will instead first seek to sparingly drop video frames. Especially in the case of video in a window of an interactive application, the means of substituting video frames with null frames provides an effective means to control video bandwidth.

The user interface graphics have the next priority after video. As these elements are generally not moving or are moving slowly, the delivery may be delayed briefly when congestion in the channel is eminent. However, the decision logic of the intelligent multiplex can be programmatically informed of the nature of the interactive application and can choose to raise the priority of the user interface graphics in the event that the video associated with the application is less important that the prompt appearance of a user interface element such as a menu appearing when a user clicks a button on the remote or clicks a virtual button displayed on the screen. A ready example would be a television program guide displaying many video windows of different television channels. When a user elects to interact with a menu, signaled by the button press, that person's attention is not likely on the various video windows. Hence, video frames can be dropped to make way for graphical elements of the interface without the user noticing the difference in the video picture, which is predictable especially for video in a window within a larger user interface application.

Figure 15:
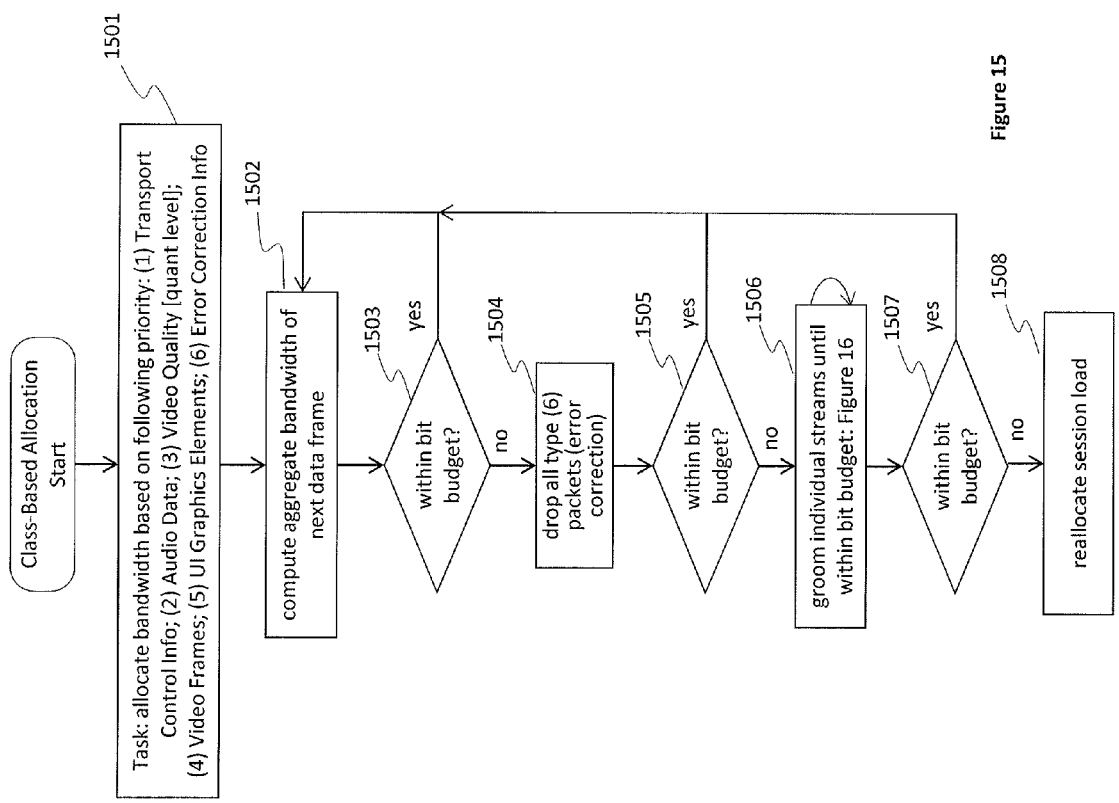
FIG. 15 is a flow chart depicting a method of managing class-based allocation for multiplexing audio, video and graphical user interface (UI) elements, in accordance with some embodiments.

FIG. 15 is a flow diagram illustrating a method of managing class-based allocation for multiplexing audio, video, and GUI elements, using the priorities described above, in accordance with some embodiments. Bandwidth is allocated (1501) to the audio, video, and graphical user interface (UI) elements based on the following priorities, listed in order from highest priority to lowest priority: (1) transport control information, (2) audio data, (3) video quality (quantization level), (4) video frames, (5) GUI elements (i.e., UI graphical elements), and (6) error-correction information. This list of priorities corresponds to the previously presented list of five priority levels, except that video quality and video frames are broken out into two different priority levels. These priorities are not absolute and can be altered (e.g., in real time) depending on specific circumstances such as a change in the application program creating the output to be multiplexed (e.g., the user switches from a video game to a program guide.)

The aggregate bandwidth of the next data frame is computed (1502). If the aggregate bandwidth is within the bit budget (1503-Yes), no action is taken and the method returns to operation 1502 for a subsequent data frame. If the aggregate bandwidth is not within the bit budget (1503-No), all priority-6 packets (i.e., with error-correction information) are dropped. If this action drops the aggregate bandwidth to within the bit budget (1505-yes), no further action is taken and the method returns to operation 1502 for a subsequent data frame. If, however, the aggregate bandwidth is still not within the bit budget (1505-no), individual streams are groomed until the aggregate bandwidth is within the bit budget (1507-yes), at which point the method returns to operation 1502 for a subsequent data frame. Grooming of an individual stream is performed in the method of FIG. 16, described below. If grooming streams does not reduce the aggregate bandwidth to within the bit budget (1507-no), then the session load is reallocated (e.g., one or more sessions is reassigned to a different QAM modulator and corresponding channel).

Figure 16:
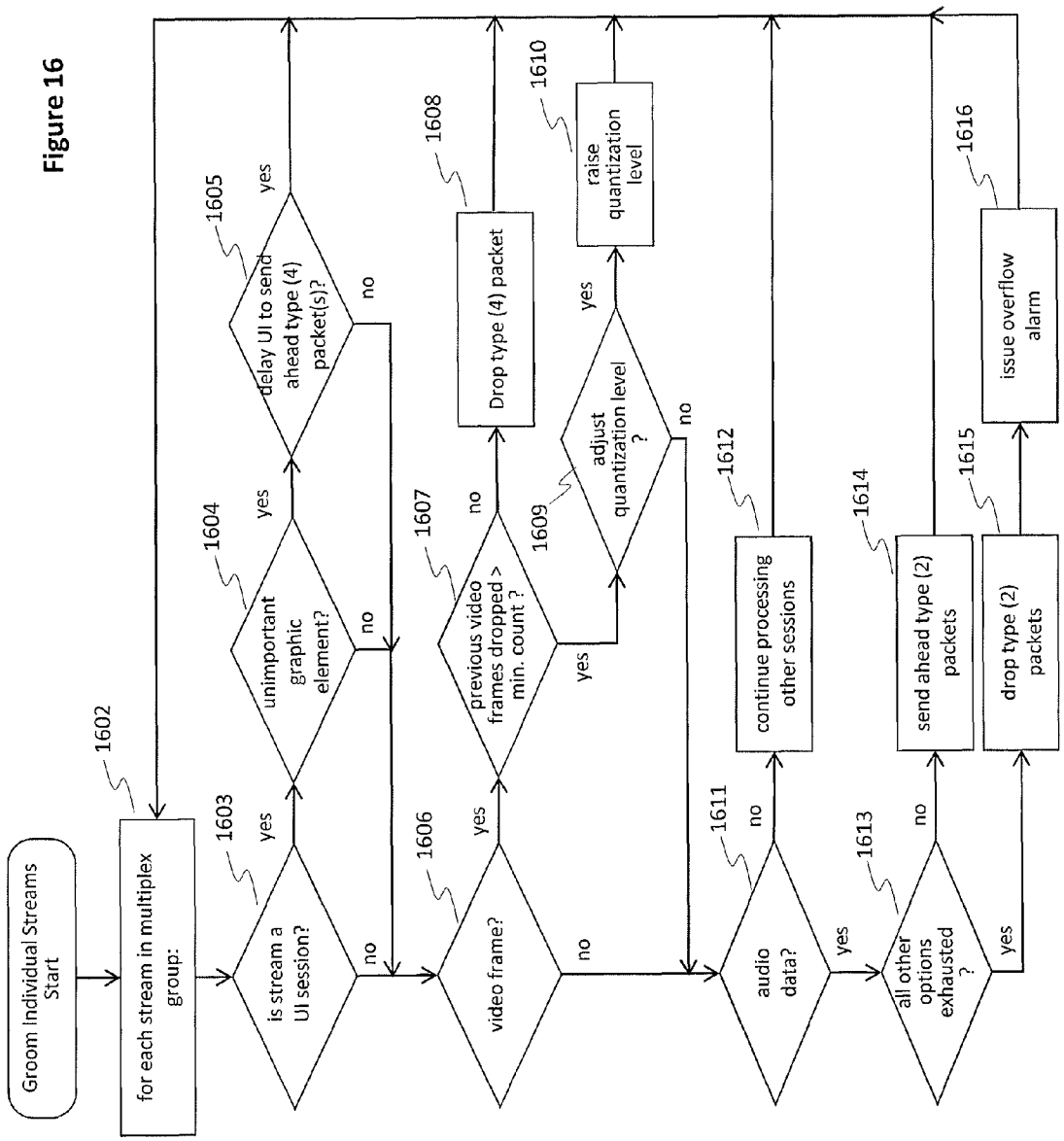
FIG. 16 is a flow chart depicting the process, in the method of FIG. 15, of individually grooming a single stream with the first time domain of the intelligent multiplexing process, in accordance with some embodiments.

FIG. 16 is a flow chart depicting the process, in the method of FIG. 15, of individually grooming (1506) a stream with the first time domain of the intelligent multiplexing process, in accordance with some embodiments. This process is performed (1602) for each stream in a multiplexed group. If the stream is a UI session (1603-Yes), it is determined (1604) whether the corresponding graphical element is unimportant (i.e., whether an importance of the graphical element satisfies a criterion). If the graphical element is not important (i.e., its importance does not satisfy the criterion) (1604-Yes), it is decided (1605) whether to delay the information in the UI session in favor of sending ahead one or more type-4 (i.e., video frame) packets. If so (1605-Yes), this action is taken and grooming then begins (1602) for another stream. If this action is not taken (1605-No), or if the graphical element is determined (1604-No) to be important (i.e., its importance satisfies the criterion), then processing continues (1612) for other sessions, and thus for other streams in the multiplex group. (Operation 1612 is reached through operations 1606-No and 1611-No.)

If the stream is video (i.e., corresponds to a video frame) (1606-Yes), it is determined (1607) whether a count of previously dropped video frames satisfies (e.g., is greater than, or greater than or equal to) a minimum count. If not (1607-No), a type-4 packet is dropped (1608) to free up bandwidth for the multiplex group. Grooming then begins (1602) for another stream. If so (1607-Yes), it is decided (1609) whether to adjust the quantization level of the video. If so (1609-Yes), the quantization level is raised (1610), thus lowering the video quality and freeing bandwidth for the multiplex group. If not (1609-No), then processing continues (1612) for other sessions, and thus for other streams in the multiplex group.

If the stream is audio (1611-yes), one or more type-2 (i.e., audio) packets may be sent ahead (1614) to be to be queued at the client device before being played. If this and all other options have been exhausted (1613-yes), however, then one or more type-2 (i.e., audio) packets are dropped (1615) and an overflow alarm issues (1616).

Figure 4A:
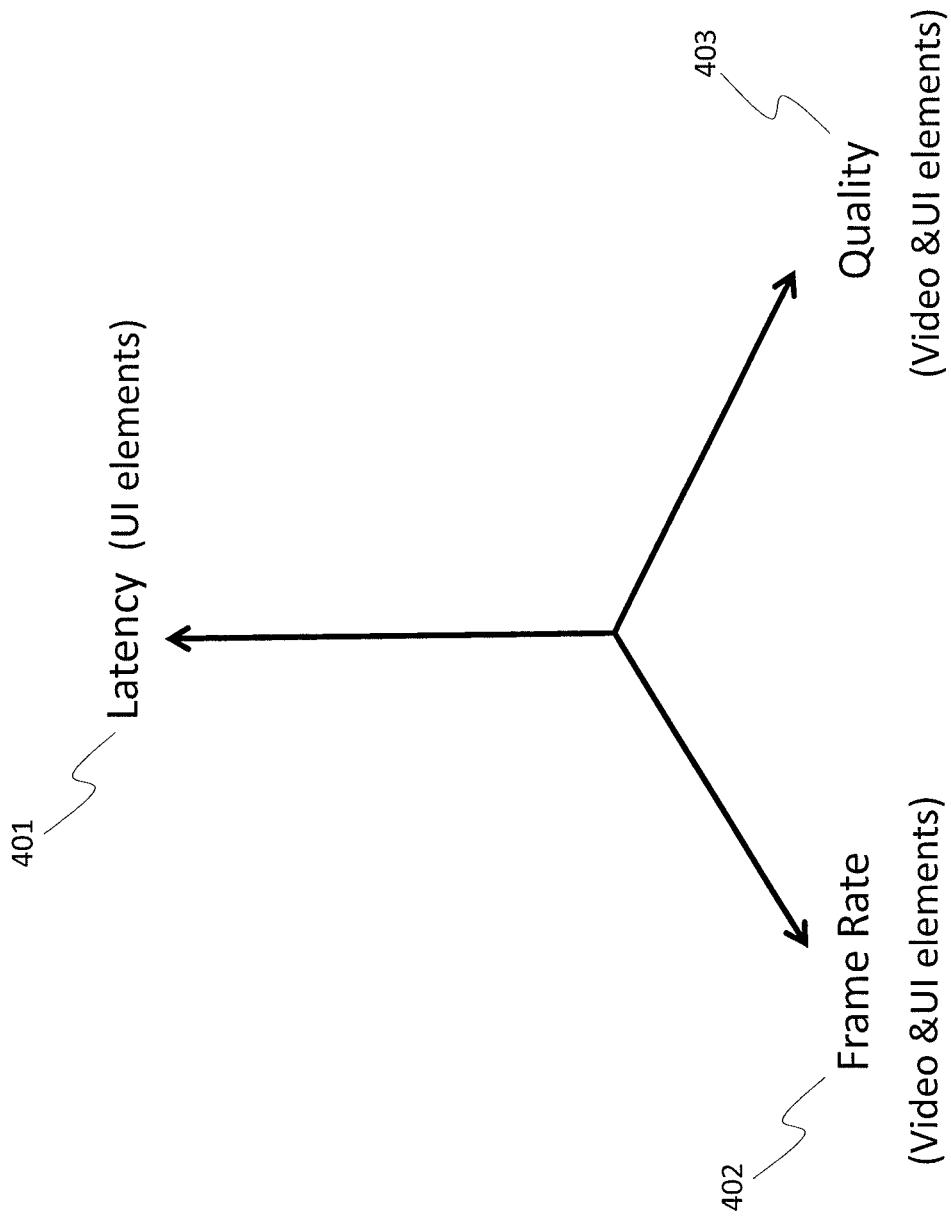
FIG. 4A is a multi-dimensional control graph showing decision paths for multiplexing audio, video and graphical user interface (UI) elements, according to some embodiments. Each dimension indicates which components of the user experience can contribute bandwidth for use by other components while minimizing the perceptual degradation of the composite user front-of-screen experience.

FIG. 4A is a multi-dimensional control graph showing decision paths for multiplexing audio, video and graphical user interface (UI) elements, according to some embodiments. Each dimension indicates which components of the user experience can contribute bandwidth for use by other components while minimizing the perceptual degradation of the composite user front-of-screen experience. FIG. 4A thus is a diagrammatic representation of three-dimensional decision logic used in class-based intelligent multiplexing in accordance with some embodiments. The three dimensions are latency 401, frame rate 402, and quality 403. The three dimensional decision logic thus may adjust (i.e., trade off) frame size versus frame rate (latency) versus frame quality (quantization). In some embodiments the control logic of the multiplexer makes decisions based on trading-off frame size for frame rate, which affects latency, or further trades image quality for either of, or a combination of, frame size and frame quality. In some embodiments, this trading off of variables is performed regardless of (i.e., independently of) whether the multiplex ensemble is approaching overflow. A diagrammatic representation of this decision logic may be seen in FIG. 4A showing the multidimensional control logic trading off Latency 401, Frame Rate 402, and Quality 403.

Figure 4B:
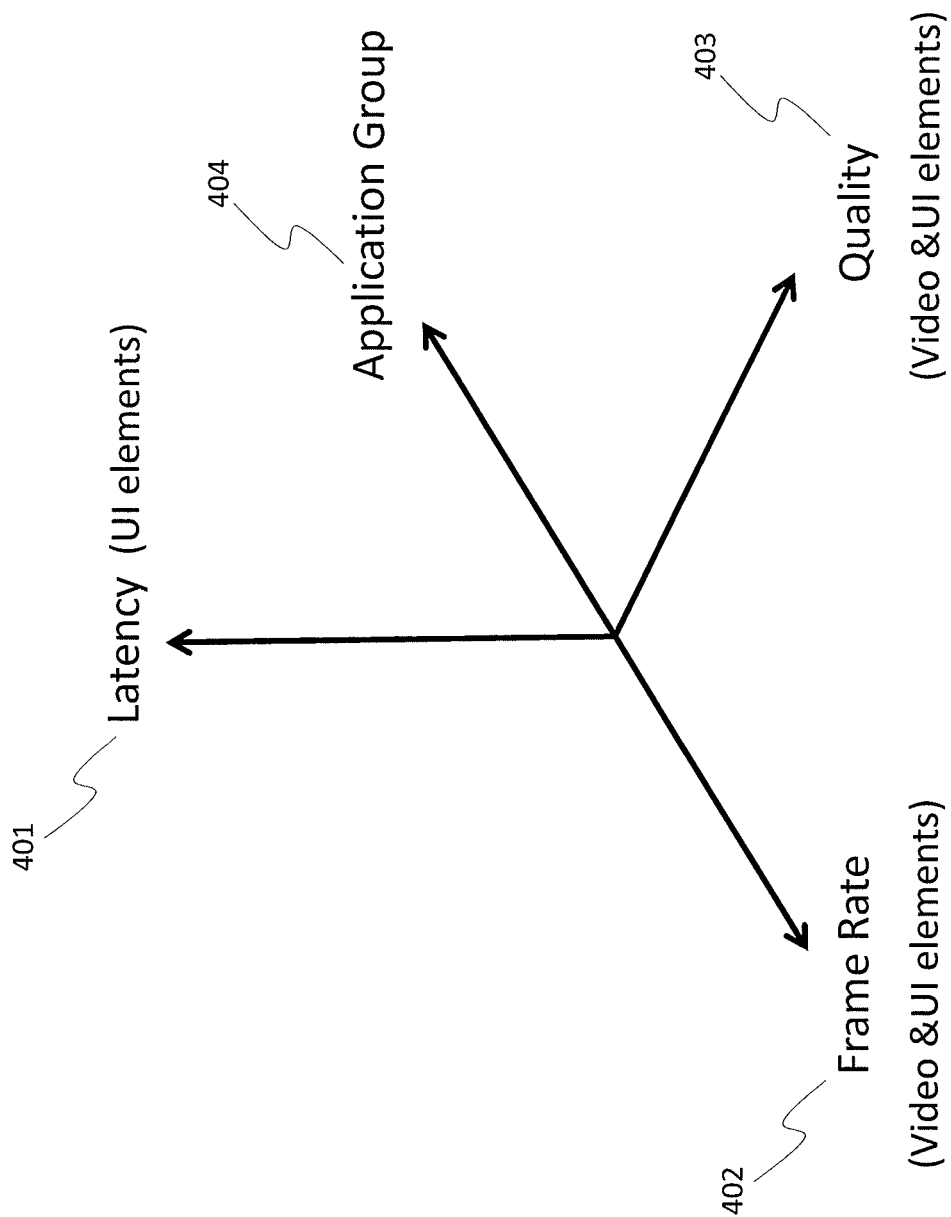
FIG. 4B is a multi-dimensional control graph showing decision paths as in FIG. 4A above with the additional decision dimension of whole application groups, in accordance with some embodiments.

FIG. 4B is a multi-dimensional control graph showing decision paths as in FIG. 4A above with the additional decision dimension of whole application groups. Class-based intelligent multiplexing thus may use four-dimensional decision logic in accordance with some embodiments; the four dimensions are latency 401, frame rate 402, quality 403, and application group 404.

The functionality described herein may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for prioritizing content classes in multiplexed content streams, comprising:
   at a server system:
   assigning a group of user sessions to a single modulator, wherein the user sessions comprise data in a plurality of classes, each class having a respective priority, wherein the plurality of classes includes, in order of priority from highest priority to lowest priority, audio data, video data, and user-interface graphical elements;
   computing an aggregate bandwidth of the group of user sessions for a first frame time;
   determining that the aggregate bandwidth for the first frame time exceeds a specified budget for the modulator;
   in response to determining that the aggregate bandwidth for the first frame time exceeds the specified budget, allocating bandwidth for the group of user sessions during the first frame time in accordance with the class priorities;
   using the modulator, multiplexing the group of user sessions onto a channel corresponding to the modulator, in accordance with the allocated bandwidth; and
   transmitting the multiplexed group of user sessions over a managed network.

2. The method of claim 1, wherein the plurality of classes further includes transport control information and error-correction information, wherein the transport control information has a higher priority than the audio data and the error-correction information has a lower priority than the user-interface graphical elements.

3. The method of claim 2, wherein allocating the bandwidth comprises:
   providing bandwidth for all transport control information in the group of user sessions for the first frame time; and
   dropping packets containing error-correction information for one or more user sessions of the group of user sessions.

4. The method of claim 3, wherein allocating the bandwidth comprises dropping all packets containing error-correction information for the group of user sessions during the first frame time.

5. The method of claim 4, wherein allocating the bandwidth further comprises:
   after dropping all packets containing error-correction information, determining that the aggregate bandwidth for the first frame time still exceeds the specified budget; and
   in response to determining that the aggregate bandwidth for the first frame time still exceeds the specified budget, reducing the size of one or more user sessions in the group of user sessions until the aggregate bandwidth for the first frame time does not exceed the specified budget,
   wherein reducing the size of the one or more user sessions is performed in accordance with the class priorities.

6. The method of claim 5, wherein reducing the size of the one or more user sessions comprises, for a respective user session of the group of user sessions:
   determining that an importance of a user-interface graphical element satisfies a criterion; and
   in response to determining that the importance of the user-interface graphical element satisfies the criterion, allocating bandwidth to the user-interface graphical element.

7. The method of claim 5, wherein reducing the size of the one or more user sessions comprises, for a respective user session of the group of user sessions:
   determining that an importance of a user-interface graphical element does not satisfy a criterion; and
   in response to determining that the importance of the user-interface graphical element does not satisfy the criterion, delaying the user-interface graphical element until a second frame time subsequent to the first frame time.

8. The method of claim 5, wherein reducing the size of the one or more user sessions comprises, for a respective user session of the group of user sessions:
   determining that a count of previously dropped video frames does not satisfy a threshold; and
   in response to determining that the count of previously dropped video frames does not satisfy the threshold, dropping a video frame.

9. The method of claim 5, wherein reducing the size of the one or more user sessions comprises, for a respective user session of the group of user sessions:
   determining that a count of previously dropped video frames satisfies a threshold; and
   in response to determining that the count of previously dropped video frames satisfies the threshold, increasing a quantization level of a video frame to reduce the quality of the video frame.

10. The method of claim 5, wherein reducing the size of the one or more user sessions comprises, for a respective user session of the group of user sessions:
    in response to a determination that all possible size reductions for video data and user-interface graphical elements have been achieved or that size reductions for video data and user-interface graphical elements cannot be achieved, sending audio data for the first frame time in an earlier frame time that precedes the first frame time.

11. The method of claim 5, wherein reducing the size of the one or more user sessions comprises, for a respective user session of the group of user sessions:

in response to a first determination that all possible size reductions for video data and user-interface graphical elements have been achieved or that size reductions for video data and user-interface graphical elements cannot be achieved, dropping packets containing audio data and issuing an overflow alarm.

12. The method of claim 1, wherein:
allocating the bandwidth comprises:
providing bandwidth for all audio data in the group of user sessions;
delaying packets containing data for a user-interface graphical element until a second frame time subsequent to the first frame time; and
allocating bandwidth freed by delaying the packets containing data for the user-interface graphical element to video data.

13. The method of claim 1, wherein:
allocating the bandwidth comprises:
providing bandwidth for all audio data in the group of user sessions;
reducing a frame rate for a user-interface graphical element; and
allocating bandwidth freed by reducing the frame rate for the user-interface graphical element to video data.

14. The method of claim 1, further comprising, at the server system, altering the class priorities in real time, the altering comprising prioritizing a user-interface graphical element higher than video data for a video frame;
wherein allocating the bandwidth comprises:
providing bandwidth for all audio data in the group of user sessions;
dropping the video frame; and
allocating bandwidth freed by dropping the video frame to the user-interface graphical element.

15. The method of claim 14, wherein prioritizing the user-interface graphical element higher than the video data for the video frame, dropping the video frame, and allocating the bandwidth freed by dropping the video frame to the user-interface graphical element are performed in response to the user-interface graphical element containing a user-interface update generated based on user input.

16. The method of claim 1, wherein:
allocating the bandwidth comprises:
providing bandwidth for all audio data in the group of user sessions;
reducing the quality of an update for a user-interface graphical element; and
allocating bandwidth freed by reducing the quality of the update for the user-interface graphical element to video data.

17. The method of claim 1, wherein assigning the group of user sessions to the single modulator comprises:
allocating bandwidth headroom to the channel corresponding to the modulator;
adding successive user sessions for client devices in a client service area served by the modulator to the group of user sessions until the group is full;
for each successive user session added to the group of user sessions, allocating a base amount of bandwidth to the channel; and
as each successive user session is added to the group of user sessions, reducing the bandwidth headroom.

18. The method of claim 1, wherein the modulator is a quadrature-amplitude-modulation (QAM) modulator.

19. A server system, comprising:
a plurality of modulators to multiplex respective groups of user sessions onto respective channels for transmission over a managed network, in accordance with allocated bandwidth;
one or more processors; and
memory storing one or more programs configured to be executed by the one or more processors, the one or more programs including instructions for:
assigning a group of user sessions to a single modulator of the plurality of modulators, wherein the user sessions comprise data in a plurality of classes, each class having a respective priority, wherein the plurality of classes includes, in order of priority from highest priority to lowest priority, audio data, video data, and user-interface graphical elements;
computing an aggregate bandwidth of the group of user sessions for a first frame time;
determining that the aggregate bandwidth for the first frame time exceeds a specified budget for the modulator; and
in response to determining that the aggregate bandwidth for the first frame time exceeds the specified budget, allocating bandwidth for the group of user sessions during the first frame time in accordance with the class priorities.

20. A non-transitory computer-readable storage medium storing one or more programs configured for execution by one or more processors of a server system that further comprises a plurality of modulators to multiplex respective groups of user sessions onto respective channels for transmission over a managed network in accordance with allocated bandwidth, the one or more programs comprising instructions for:
assigning a group of user sessions to a single modulator of the plurality of modulators, wherein the user sessions comprise data in a plurality of classes, each class having a respective priority, wherein the plurality of classes includes, in order of priority from highest priority to lowest priority, audio data, video data, and user-interface graphical elements;
computing an aggregate bandwidth of the group of user sessions for a first frame time;
determining that the aggregate bandwidth for the first frame time exceeds a specified budget for the modulator; and
in response to determining that the aggregate bandwidth for the first frame time exceeds the specified budget, allocating bandwidth for the group of user sessions during the first frame time in accordance with the class priorities.

* * * * *